United States Patent
Yoshida et al.

(10) Patent No.: US 9,448,129 B2
(45) Date of Patent: Sep. 20, 2016

(54) TORQUE SENSOR UNIT

(71) Applicant: HITACHI AUTOMOTIVE SYSTEMS STEERING, LTD., Hiki-gun, Saitama (JP)

(72) Inventors: Osamu Yoshida, Yokohama (JP); Tatsuyoshi Maruyama, Atsugi (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 0 days.

(21) Appl. No.: 14/422,927

(22) PCT Filed: Sep. 17, 2013

(86) PCT No.: PCT/JP2013/074990
§ 371 (c)(1),
(2) Date: Feb. 20, 2015

(87) PCT Pub. No.: WO2014/040676
PCT Pub. Date: Mar. 27, 2014

(65) Prior Publication Data
US 2015/0211947 A1    Jul. 30, 2015

(30) Foreign Application Priority Data
Sep. 18, 2012   (JP) .................. 2012-203883

(51) Int. Cl.
*G01L 3/10*     (2006.01)
*B62D 6/10*     (2006.01)

(52) U.S. Cl.
CPC ............. *G01L 3/101* (2013.01); *B62D 6/10* (2013.01); *G01L 3/104* (2013.01)

(58) Field of Classification Search
CPC ....... B62D 5/0463; B62D 6/10; G10L 3/101; G10L 3/102; G10L 3/104; G10L 5/221; G10L 3/10

USPC ................ 73/862.325, 862.331–862.338
See application file for complete search history.

(56) References Cited

U.S. PATENT DOCUMENTS

| | | | |
|---|---|---|---|
| 7,028,545 B2* | 4/2006 | Gandel | G01L 3/104 73/328 |
| 7,555,963 B2* | 7/2009 | Maehara | G01L 3/104 73/862.331 |
| 9,004,221 B2* | 4/2015 | Yoshida | G01L 5/221 180/443 |
| 2004/0194560 A1 | 10/2004 | Froehlich et al. | |
| 2007/0186695 A1 | 8/2007 | Tokumoto et al. | |
| 2011/0000319 A1 | 1/2011 | Maehara | |

FOREIGN PATENT DOCUMENTS

| | | |
|---|---|---|
| JP | 06-180206 | 6/1994 |
| JP | 2004-309463 | 11/2004 |

(Continued)

OTHER PUBLICATIONS

International Search Report dated Oct. 15, 2013 issued in PCT/JP2013/074990.

*Primary Examiner* — Lisa Caputo
*Assistant Examiner* — Octavia Hollington
(74) *Attorney, Agent, or Firm* — Foley & Lardner LLP

(57) ABSTRACT

Disclosed is a torque sensor unit including a magnetic member fixed to a first output shaft member, a pair of first and second yoke members fixed to an input shaft member and surrounding an outer circumferential side of the magnetic member and a magnetic sensor adapted to detect a magnetic flux passing through between the yoke members. The magnetic member is provided with a sleeve and a permanent magnet. The sleeve is formed of a metal material in a substantially cylindrical shape and has a plurality of radially extending support portions and a plurality of axially extending engagement protrusions between the support portions. The permanent magnet is formed into an annular shape and has a plurality of axially extending engagement grooves cut in an inner circumferential surface thereof. The permanent magnet and the sleeve are coupled via a resin-based filling material.

16 Claims, 19 Drawing Sheets

(56) References Cited

FOREIGN PATENT DOCUMENTS

| JP | 2007-205809 | 8/2007 |
| JP | 2008-203176 | 9/2008 |
| JP | 2010-249734 | 11/2010 |
| JP | 2011-013133 | 1/2011 |
| JP | 2011-013134 | 1/2011 |
| JP | 2012-168046 | 9/2012 |

* cited by examiner (a)

(b)

(a)

(b)

TORQUE SENSOR UNIT

FIELD OF THE INVENTION

The present invention relates to a torque sensor unit used for detection of a driver's steering torque in a steering device of a vehicle etc.

BACKGROUND ART

A torque sensor unit of the type disclosed in Patent Document 1 is conventionally known for use in e.g. a steering device of a vehicle.

A brief explanation of this type of torque sensor unit will be given as follows. Herein, a steering shaft of the steering device has two shaft members relatively rotatably connected to each other through a torsion bar. The torque sensor unit is coupled around one of the shaft members of the steering shaft and includes: a magnetic member having a plurality of magnetic poles arranged in a circumferential direction; a pair of first and second annular yoke members formed of a soft magnetic material with a plurality of radially inwardly extending claw portions and coupled around the other shaft member through a predetermined holder; a pair of first and second magnetosensitive members disposed in a circumferential area between the first and second yoke members so as to face each other (in the axial direction) and adapted to develop a magnetic field between the first and second yoke members; and a magnetic sensor accommodated in an air gap between the first and second magnetosensitive members and adapted to detect a magnetic flux passing through between the magnetosensitive members. By such a structure, the torque sensor unit determines a torque inputted to the steering shaft according to a change in magnetic flux (magnetic flux density) detected by the magnetic sensor.

PRIOR ART DOCUMENTS

Patent Document

Patent Document 1: Japanese Laid-Open Patent Publication No. 2004-309463

SUMMARY OF THE INVENTION

Problem to be Solved by the Invention

In the above conventional torque sensor unit, the magnetic member has an annular magnet called a magnet ring and a sleeve called a magnet holder to fix the magnet to the steering shaft. The magnet and the sleeve are joined together through a predetermined resin material.

However, the resin material is susceptible to temperature changes and is significantly deteriorated with time. There thus arises a problem that the resin material becomes thermally expanded due to its expansion coefficient higher than those of metal materials or becomes broken by shrinkage during cold temperatures so that the magnet cannot be stably fixed in position.

In view of the foregoing technical problem, the present invention has been made to provide a torque sensor unit capable of stably maintaining the fixed state of a magnet.

Means for Solving the Problem

According to the present invention, there is provided a torque sensor unit for detecting a torque applied to a rotating element, the rotating element having first and second shaft members formed of a metal material and connected to each other through a torsion bar, the torque sensor unit comprising: a sleeve formed of a metal material and including: an annular or arc-shaped sleeve body surrounding the first shaft member; a fixing part provided on the sleeve body and fixing the sleeve body to the first shaft member; an axial position restricting part provided on the sleeve body and having a support surface directed vertically upward during use of the torque sensor unit; and a radial position restricting part provided on the sleeve body and extending in a direction of a rotation axis of the rotating element; an annular magnet formed of a composite material of resin and magnetic materials, with different magnetic poles alternately arranged in a circumferential direction, and surrounding the first shaft member, the magnet being placed on the support surface and thereby restricted in position in the direction of the rotation axis of the rotating element while being restricted in position in a radial direction by the radial position restricting part; a filling material formed from a resin material having a smaller Young's modulus than that of the magnet and held in intimate contact with the magnet and the radial position restricting part; a first yoke member formed of a magnetic material, fixed to the second shaft member so as to rotate together with the second shaft member and including: a plurality of first claw portions facing the magnet; and a first annular portion connecting the first claw portions; a second yoke member formed of a magnetic material, fixed to the second shaft member so as to rotate together with the second shaft member and including: a plurality of second claw portions circumferentially alternated with the first claw portions and facing the magnet; and a second annular portion connecting the second claw portions; and a magnetic sensor having a hall element to detect a change in magnetic field between the first and second yoke members and generate an output signal such that the torque applied to the rotating element can be detected based on the output signal from the magnetic sensor.

Effects of the Invention

It is possible in the present invention to prevent axial and radial displacement of the magnet by the support surface and the radial position restricting part of the metallic sleeve and thereby stably maintain the fixed state of the magnet relative to the first shaft member.

BRIEF DESCRIPTION OF DRAWINGS

FIG. 18(*b*) is a perspective view of an assembly of a permanent magnet and a sleeve in the magnetic member of FIG. 18(*a*).

FIG. 19(*b*) is a section view of the magnetic member of FIG. 19(*a*) as taken along line C-C.

FIG. 20(*b*) is a perspective view of an assembly of a permanent magnet and a sleeve in the magnetic member of FIG. 19(*a*).

FIG. 21(*b*) is a section view of the magnetic member of FIG. 21(*a*) as taken along line D-D.

FIG. 22(*b*) is a perspective view of an assembly of a permanent magnet and a sleeve in the magnetic member of FIG. 22(*a*).

FIG. 23(*b*) is a section view of the magnetic member of FIG. 23(*a*) as taken along line E-E.

DESCRIPTION OF EMBODIMENTS

Hereinafter, embodiments of the present invention will be described below in detail with reference to the drawings. By way of example, the following embodiments each refer to a toque sensor unit applied to a rack and pinion electric power steering device of a vehicle.

First Embodiment

Figure 1:
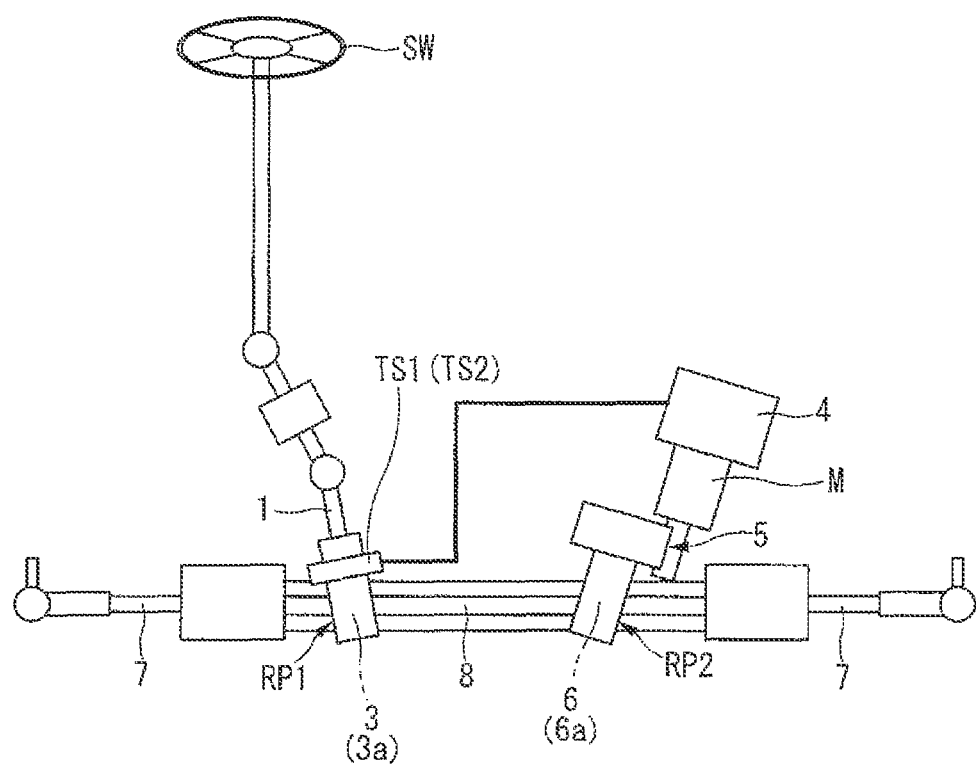
FIG. 1 is a schematic view of a power steering device to which the present invention is applicable.

FIGS. 1 to 12 show the torque sensor unit according to the first embodiment of the present invention. In the power steering device to which the torque sensor unit according to the first embodiment of the present invention is applied as shown in FIG. 1, a steering shaft is constituted by an input shaft member 1 (corresponding to the claimed second shaft member) and a first output shaft member 3 (corresponding to the claimed first shaft member). The input shaft member 1 is connected at one end portion thereof to a steering wheel SW. The first output shaft member 3 is relatively rotatably connected at one end portion thereof to the input shaft member 1 through a torsion bar 2 such that the input shaft member 1 and the output shaft member 3 are rotatable relative to each other. A first rack and pinion mechanism RP1 is disposed in one side of the power steering device in a vehicle width direction to establish a connection between the steering shaft and vehicle wheels (not shown). The torque sensor unit TS1 is attached to the outer circumference of the steering shaft. An electric motor M is driven by an ECU 4 based on an output signal of the torque sensor unit TS1. A second shaft member 6 is connected to the electric motor M through a reduction gear mechanism 5 such as worm gear. A second rack and pinion mechanism RP2 is disposed in the other side of the power steering device in the vehicle width direction to provide a connection between the second output shaft 6 and vehicle wheels (not shown). In the first embodiment, both of the shaft members 1 and 3 constituting the steering shaft are formed of a predetermined magnetic metal material.

A rack bar 8 is coupled at respective ends thereof to the vehicle wheels through tie rods 7 and 7. The first rack and pinion mechanism RP1 has a first pinion gear 3*a* disposed on the other end portion of the first output shaft 3 and a first rack gear (not shown) disposed on one end portion of the rack bar 8; whereas the second rack and pinion mechanism RP2 has a second pinion gear 6*a* coupled to a distal end portion of the second output shaft 6 and a second rack gear (not shown) disposed on the other end portion of the rack bar 8.

In the above structure, the torsion bar 2 is twisted and deformed when a steering torque is inputted from the steering wheel SW to the input shaft member 1. When the torsion bar 2 is returned from such a twisted/deformed state, there occurs a rotational torque to cause a rotation of the first output shaft member 3. The rotation of the first output shaft member 3 is converted to a linear movement of the rack bar 8 by the first rack and pinion mechanism RP1 so as to steer the vehicle wheels. At the same time, the electric motor M generates a steering assist torque based on the steering torque to cause a rotation of the second output shaft member 6. The rotation of the second output shaft member 6 is converted to a linear movement of the rack bar 8 by the second rack and pinion mechanism RP2 so as to assist the steering of the vehicle wheels. The steering direction of the vehicle wheels is changed by these operational movements.

Figure 2:
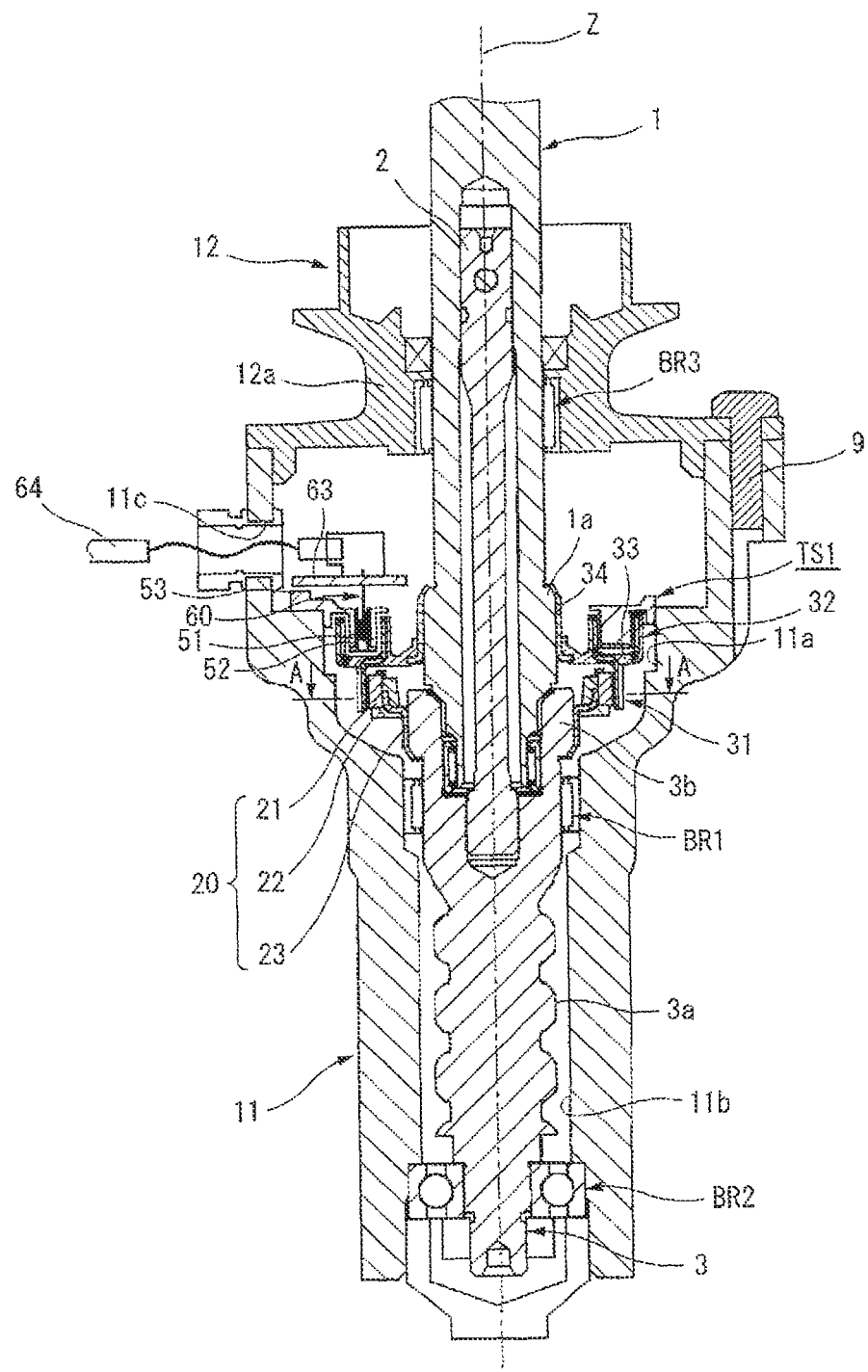
FIG. 2 is a vertical section view of a torque sensor unit according to a first embodiment of the present invention as applied to a steering system (a first rack and pinion mechanism and its surroundings) of the power steering device of FIG. 1.
Figure 3:
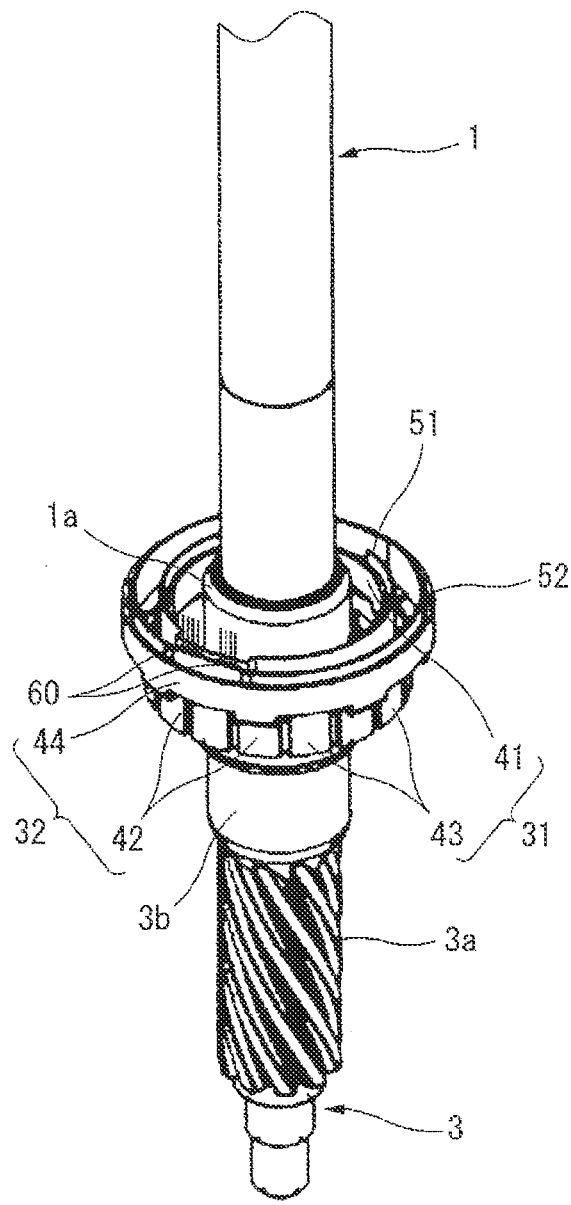
FIG. 3 is a perspective view of the torque sensor unit of FIG. 2.
Figure 4:
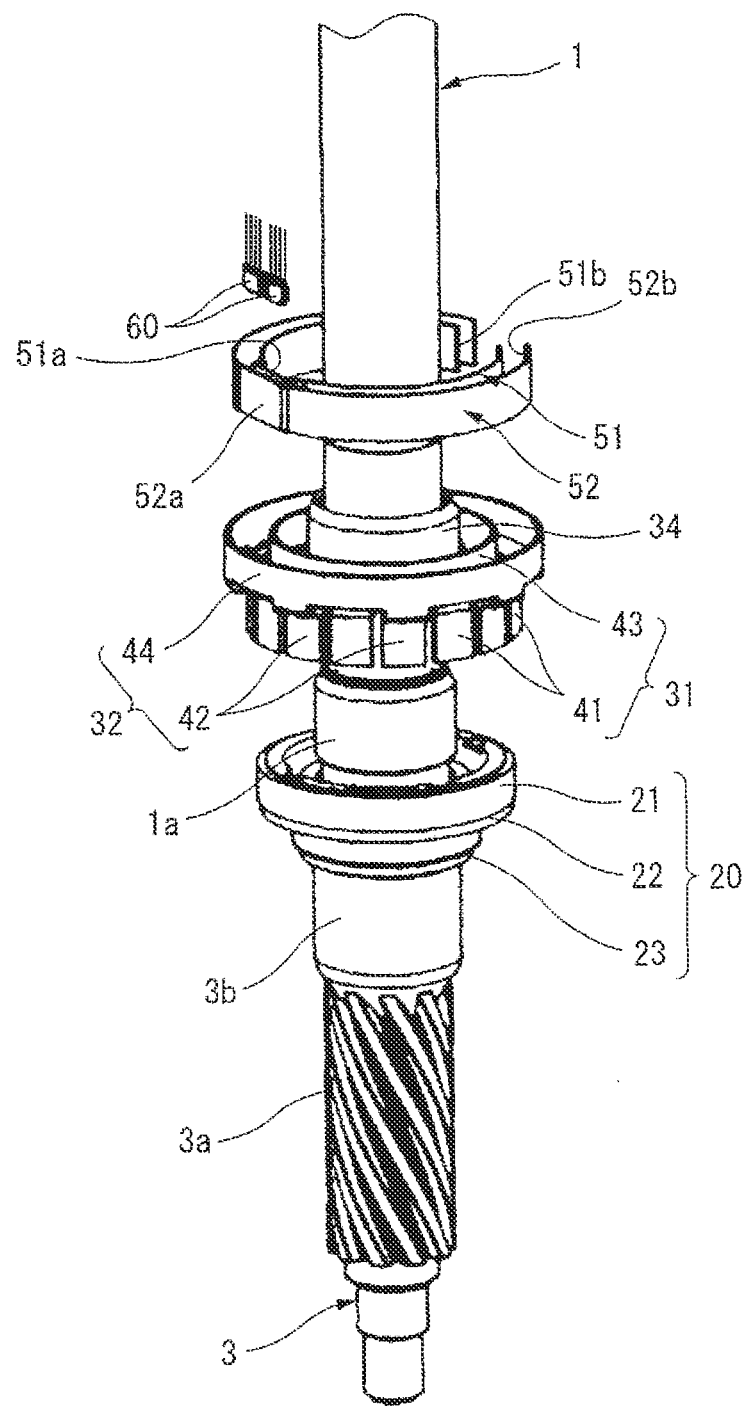
FIG. 4 is an exploded perspective view of the torque sensor unit of FIG. 3.
Figure 5:
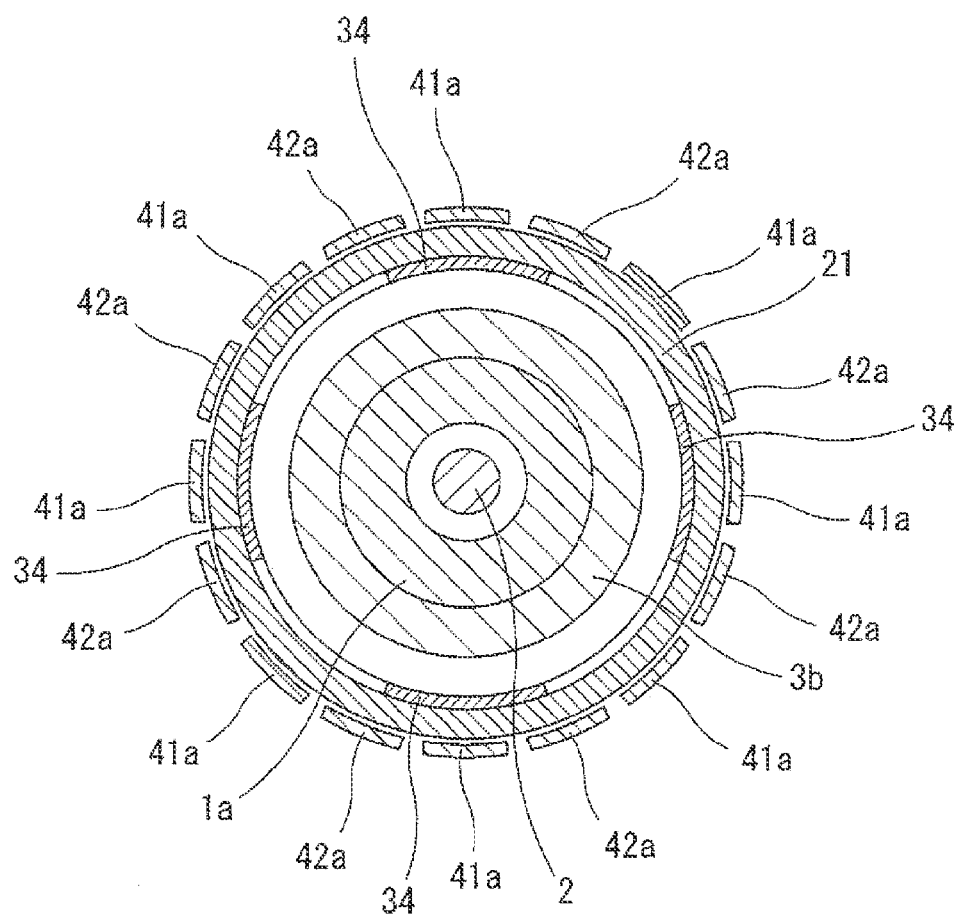
FIG. 5 is a section view of the torque sensor unit of FIG. 2 as taken along line A-A.
Figure 6:
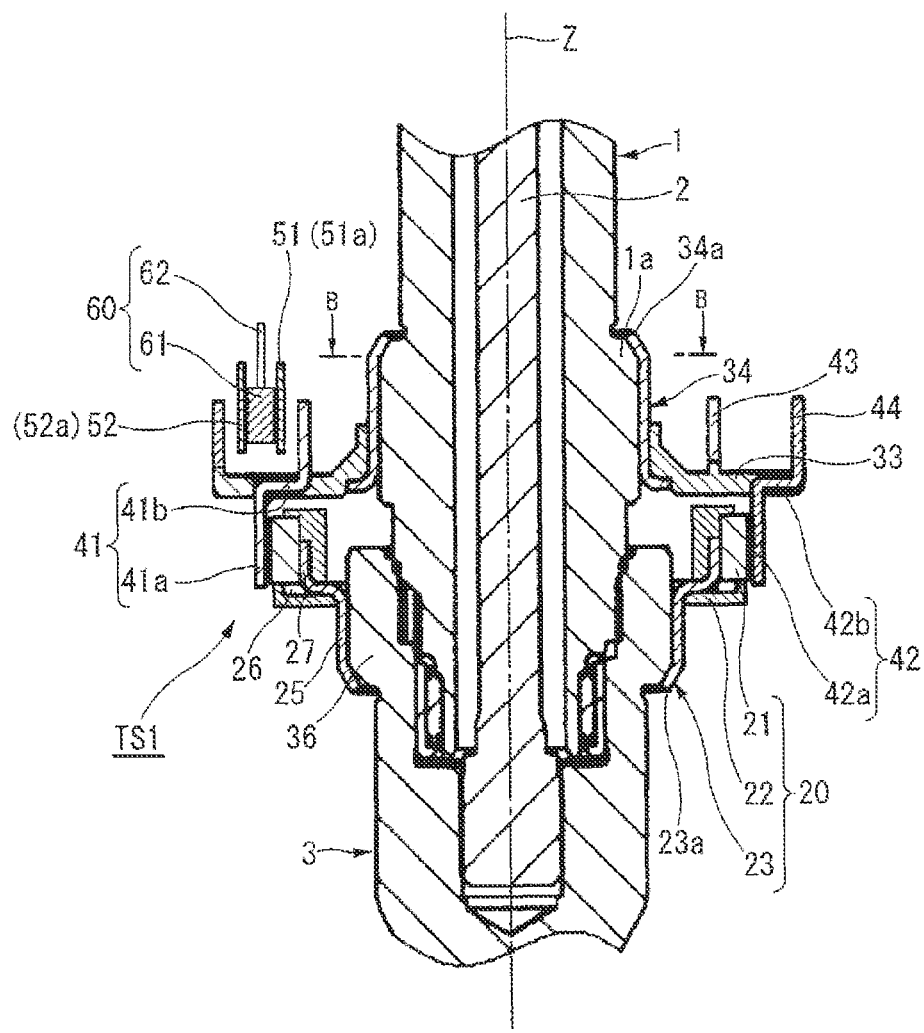
FIG. 6 is an enlarged view of the vicinity of the torque sensor unit of FIG. 5.

As specifically shown in FIG. 2, the other end side of the input shaft member 1 and the whole of the first output shaft member 3 are accommodated together with the first rack and pinion mechanism RP1 in a first gear housing 10. The first gear housing 10 includes a substantially cylindrical housing body 11 having a pair of housing members fixed circumferentially by a plurality of bolts 9 and accommodating therein whole of the first output shaft member 3 and a housing cover 12 closing an upper opening end of the housing body 11.

The housing body 11 has a large-diameter portion 11*a* located on one end side thereof and stepwisely increased in diameter and a small-diameter portion 11*b* located on the other end side thereof and having a relatively small diameter slightly larger than an outer diameter of the first output shaft member 3. The input shaft member 1 is inserted through the large-diameter portion 11a so as to bring the other end portion of the input shaft member 1 into abutment with the one end portion of the first output shaft member 3. The torque sensor unit TS1 is disposed around the joint region between these shaft members 1 and 3. A pair of bearings BR1 and BR2 are disposed in both ends of the small-diameter portion 11b of the housing body 11 such that the first output shaft member 3 is rotatably supported by the bearings BR1 and BR2. Further, a bearing BR3 is disposed in an axially middle narrowed portion 12a of the housing cover 12 such that the input shaft member 1 is rotatably supported by the bearing BR3.

As shown in FIGS. 2 to 6, the torque sensor unit TS includes: a substantially cylindrical magnetic member 20 fixed around the one end portion of the first output shaft member 3 so as to rotate together with the first output shaft member 3; a pair of first and second substantially annular yoke members 31 and 32 formed of a soft magnetic material and fixed around the other end portion of the input shaft member 1 so as to rotate together with the first input shaft member 1, with one end sides (lower end sides in FIG. 6) of the yoke members 31 and 32 radially facing the magnetic member 20 and being kept spaced apart from each other (kept from direct contact with each other); a pair of first and second substantially annular magnetosensitive members 51 and 52 disposed in a radial space between the other end sides (upper end sides in FIG. 6) of the yoke members 31 and 32 and adapted to converge a magnetic field (magnetic flux) leaking thereto from the magnetic member 20 to within a predetermined range; and a pair of magnetic sensors 60 and 60 accommodated in an air gap space between the first and second magnetosensitive members 51 and 52 and adapted to detect the magnetic flux passing through between the first and second magnetosensitive members 51 and 52.

Figure 7:
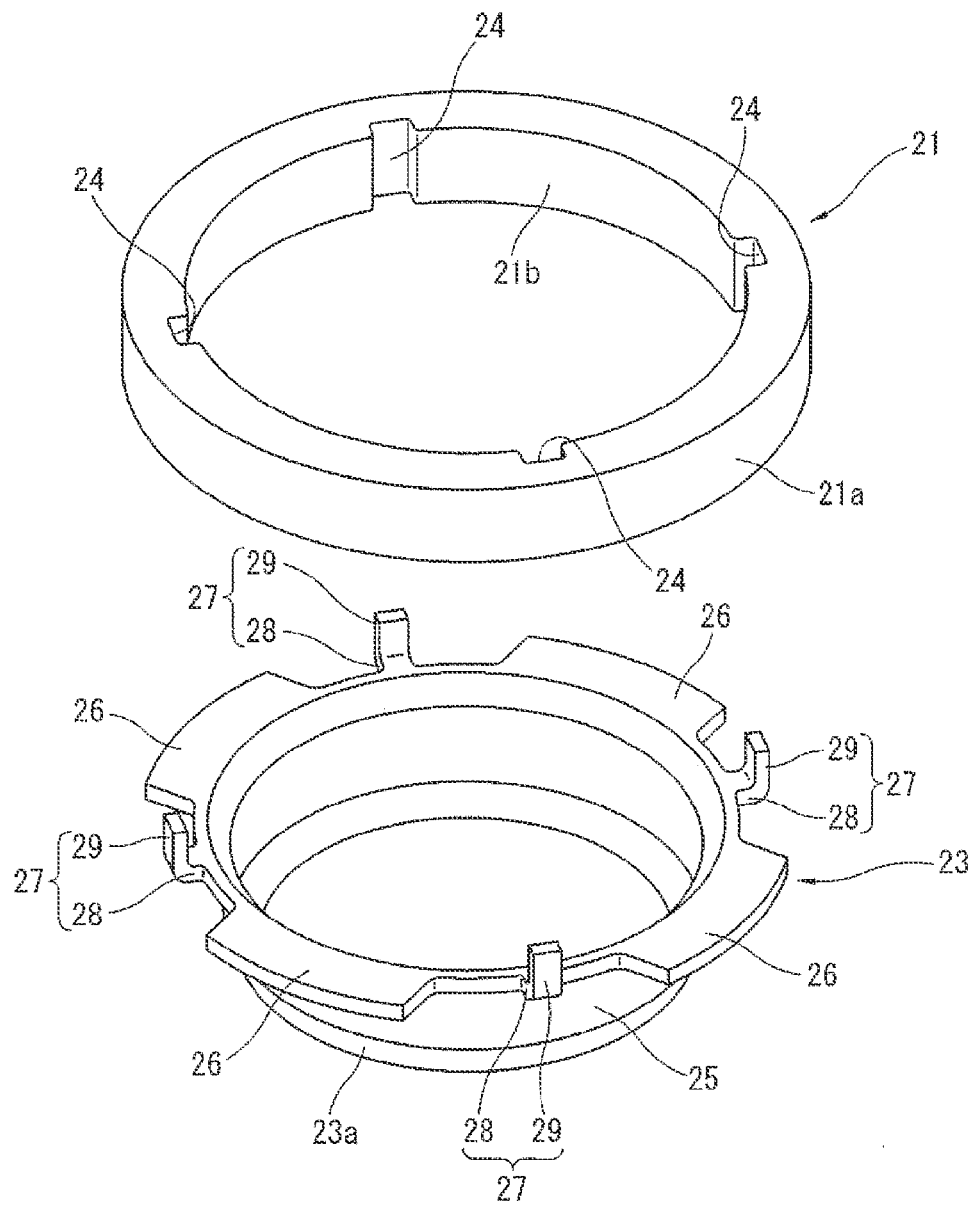
FIG. 7 is an exploded perspective view of a magnetic member shown in FIG. 6.
Figure 8:
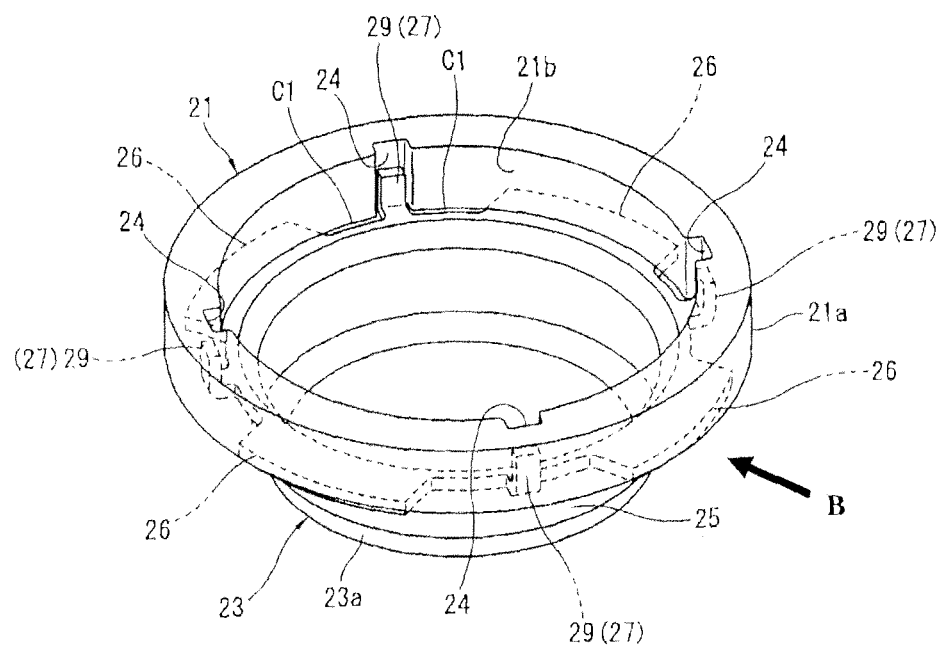
FIG. 8 is a perspective view of an assembly of a permanent magnet and a sleeve in the magnetic member of FIG. 7.
Figure 9:
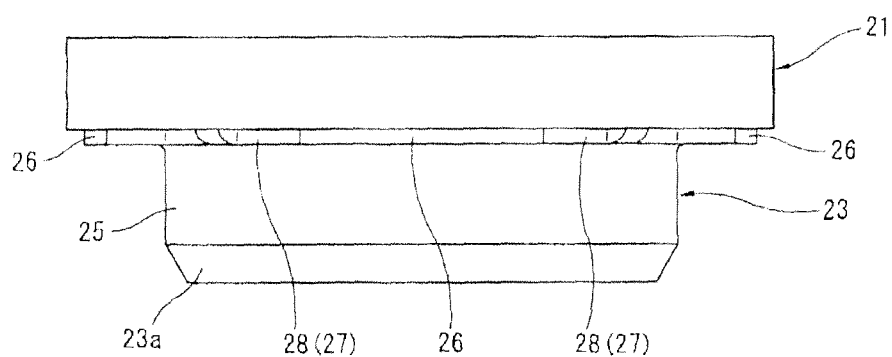
FIG. 9 is a side view of the assembly of FIG. 8 as taken in the direction of arrow B.
Figure 10:
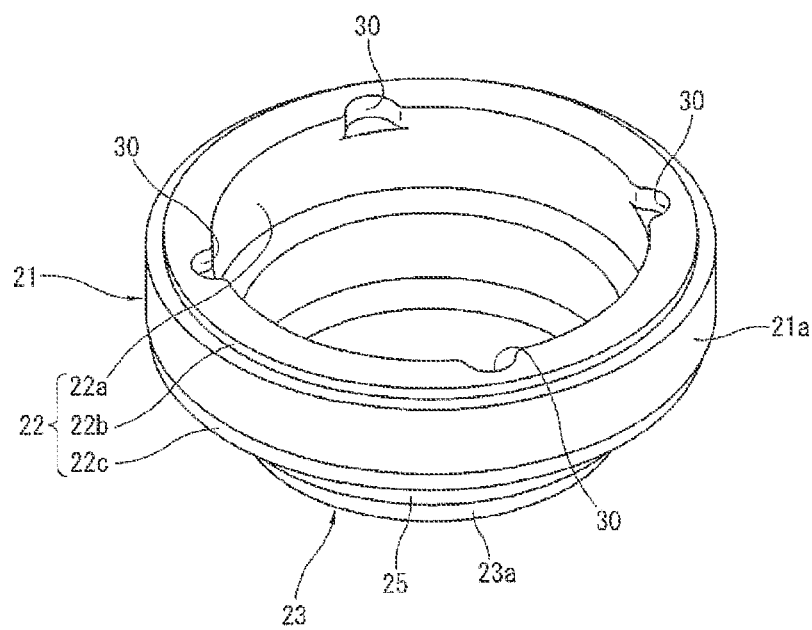
FIG. 10 is a perspective view of the magnetic member shown in FIG. 6 in a state where the assembly shown in FIG. 7 is filled with a filling material.
Figure 11:
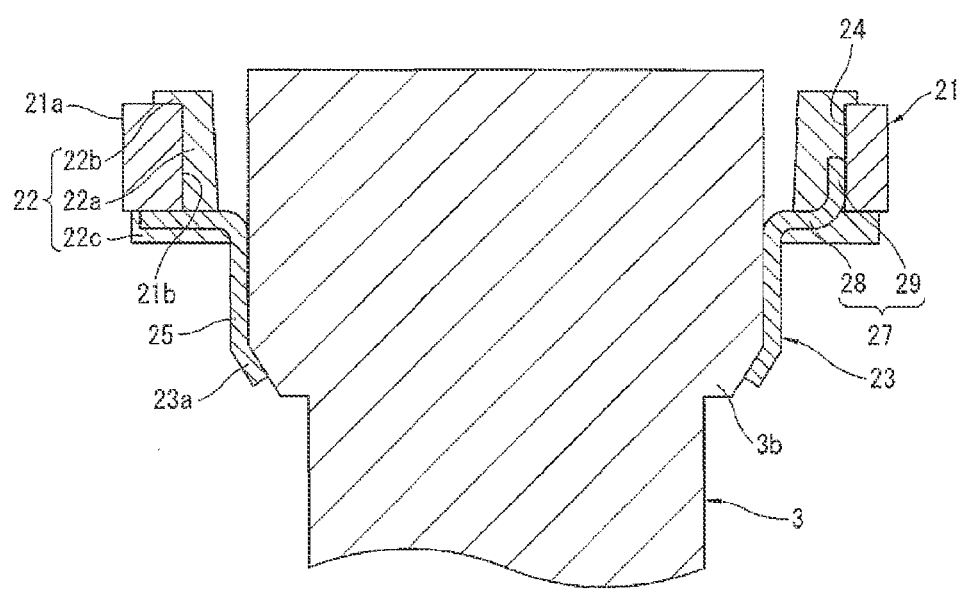
FIG. 11 is an enlarged view of the vicinity of the magnetic member shown in FIG. 6.

The magnetic member 20 has an annular permanent magnet 21 formed of a composite material of resin and magnetic materials, a substantially cylindrical metallic sleeve 23 formed of a metal material and fixing the permanent magnet 21 to the first output shaft member 3 and a resin-based filling material 22 filled in between the permanent magnet 21 and the sleeve 23 so as to integrally mold the permanent magnet 21 and the sleeve 23 into one module as shown in FIGS. 7, 10 and 11. To fix the magnetic member 20 to the outer circumference of the first output shaft member 3 through the sleeve 23, a tapered distal end portion 23a as a fixing part of the sleeve 23 is fitted around and circumferentially laser welded to a stepwisely diameter-increased large-diameter portion 3b of the first output shaft member 3.

More specifically, the permanent magnet 21 has a plurality of different magnetic poles (N and S poles; sixteen magnetic poles in total including eight N poles and eight S poles in the first embodiment) alternately arranged in a circumferential direction. An outer circumferential surface 21a of the permanent magnet 21 is made even, whereas four substantially rectangular cross-section engagement grooves 24 are cut in an inner circumferential surface 21b of the permanent magnet 21 at circumferentially equally spaced positions 90 degrees apart from each other so as to extend axially throughout the entire length.

An inner diameter of the permanent magnet 21 is set larger than the amount of cold shrinkage of the permanent magnet 21 so that the magnetic field characteristics of the permanent magnet 21 can be prevented from being changed by internal stress due to press contact between the permanent magnet 21 and the first output shaft member 3 during cold shrinkage of the permanent magnet 21.

The sleeve 23 is formed of a non-magnetic metal material such as stainless steel or aluminum with a small thickness and has a cylindrical sleeve body 25 engageable around the large-diameter portion 3b of the first output shaft member 3, four flanged support portions 26 as an axial position restricting part extending independently radially from a base end of the sleeve body 25 (adjacent to the permanent magnet 21) and provided with respective support surfaces 26a so as to support thereon the permanent magnet 21 and four engagement protrusions 27 as a radial position restricting part extending independently axially at positions circumferentially midway between the support portions 26 so as to prevent radial displacement of the permanent magnet 21 by engagement of the engagement protrusions 27 in the engagement grooves 24 of the permanent magnet 21.

A circumferential width of the respective support portions 26 is set relatively large; and a radial width of the respective support portions 26 is set equal or similar to that of the permanent magnet 21. By this dimensional configuration, the permanent magnet 21 can be stably supported on the support portions 26.

Figure 12:
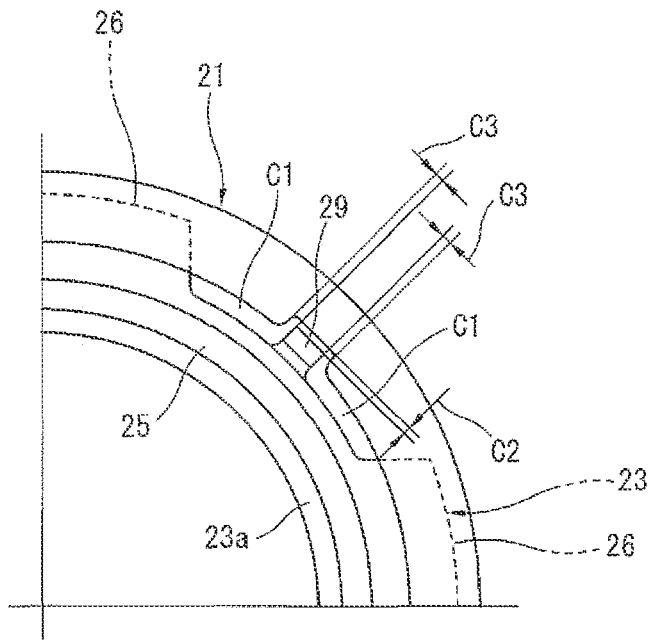
FIG. 12 is an enlarged view of substantive part of the assembly shown in FIG. 7.

The engagement protrusions 27 are situated at substantially midpoints between the adjacent support portions 26 in the circumferential direction, with predetermined circumferential gaps C1 defined between the engagement protrusions 27 and the support portions 26 (see FIG. 12). In the first embodiment, the engagement protrusions 27 extend vertically at positions offset radially outwardly relative to the base end of the sleeve body 25 such that each of the engagement protrusions 27 has a substantially L-like shape when viewed in vertical cross section. Namely, the engagement protrusions 27 include elastic base portions 28 and engagement portions 29. The elastic base portions 28 extend radially outward in a horizontal orientation from the base end of the sleeve body 26 so as to elastically deformably support the engagement portions 29. The engagement portions 29 extend in a bent shape from a distal end of the elastic base portion 28 so as to engage by insertion into the engagement grooves 24. As the engagement protrusions 27 are of thin metal material as mentioned above, each of the engagement protrusions 27 is easily deformable about a base end of the elastic base portion 28.

As shown in FIG. 12, the dimensional relationship of the engagement protrusions 27 and the engagement grooves 24 in the radial direction are set to define a predetermined radial gap C2 between the engagement protrusion 27 and the engagement groove 24. In other words, the radial gap C2 is set larger than the amount of cold shrinkage of the permanent magnet 21 so that the magnetic field characteristics of the permanent magnet 21 can be prevented from being changed by internal stress due to press contact with the engagement protrusions 27 during cold shrinkage of the permanent magnet 21. Further, the engagement protrusions 27 have good elasticity as mentioned above. Even in the case where the radial gap C2 is so small that a press force is exerted on the engagement protrusions 27 by shrinkage of the permanent magnet 21, the press force can be reduced by the elasticity of the engagement protrusions 27 so as to limit the internal stress of the permanent magnet 21.

The dimensional relationship of the engagement protrusions 27 and the engagement grooves 24 in the circumferential direction are set to define a pair of circumferential gaps C3 between the engagement protrusion 27 and the engagement grooves 27. In other words, the circumferential gap C3 is set larger than the amount of cold shrinkage of the permanent magnet 21 so that the magnetic field characteristics of the permanent magnet 21 can be prevented from being changed by internal stress as in the case of the radial gap C2.

In the first embodiment, four engagement protrusions 27 are circumferentially equally spaced about the permanent magnet 21 with sixteen magnetic poles. Namely, one engagement protrusion 27 is arranged between four N and S poles. The influence of the engagement protrusions 27 on the permanent magnet 21 can be thus uniformalized so as to avoid unbalance of the magnetic flux.

The filling material 22 is prepared from a predetermined resin material having a smaller Young's modulus than that of the permanent magnet 21. As shown in FIGS. 10 and 11, the filling material 22 is filled (formed) into an U-like shape with an inner circumferential covering portion 22a, an upper covering portion 22b and a lower covering portion 22c, when viewed in vertical cross section, so as to cover almost the whole of an inner circumferential side and upper and lower sides of the permanent magnet 21. Further, the filling material 22 is held in intimate contact with the permanent magnet 21 and the engagement protrusions 27 so as to extend over the permanent magnet 21 and the engagement protrusions 27, including both of the circumferential gaps C1 and C3, and fill in an uneven space between the permanent magnet 21 and the engagement protrusions 27.

Herein, the permanent magnet 21 and the sleeve 23 are assembled from a state of FIG. 7 by placing the permanent magnet 21 on the support portions 26 of the sleeve 23 while engaging the engagement portions 29 of the sleeve 23 into the respective engagement grooves 24 of the permanent magnet 21. After the resulting assembly 21a (see FIG. 8) is set in a molding die (not shown), the filling material 22 is injected into the molding die and solidified by cooling. Then, the magnetic member 20 in which the assembly 21a is covered by molding with the filling material 22 is obtained as shown in FIG. 10. During production of the magnetic member 22 by molding of the filling material 22, four depressions 30 are formed at positions corresponding to the engagement grooves 24 in the front side of the filling material 22 at the top of the magnetic member 22 due to positioning of the assembly 21a in the molding die via the engagement grooves 24.

The first yoke member 31 has, when viewed in vertical cross section, a crank shape with one end relatively large in diameter and the other end relatively small in diameter as shown in FIGS. 2 to 6. In the first embodiment, the first yoke member 31 includes a plurality of first claw portions 41 on one end side thereof and a first annular portion 43 on the other end side thereof. The first claw portions 41 are formed into a substantially inverted L-like cross-sectional shape so as to be radially outwardly increased in diameter. These first claw portions 41 are arranged coaxially with the steering shaft (rotation axis Z) at predetermined circumferential intervals around the magnetic member 21. The first annular portion 43 is continuously formed into an annular shape along a circumferential direction of the rotation axis Z and is connected to base ends of the first claw portions 41 so as to connect the first claw portions 41.

The second yoke member 32 also has, when viewed in vertical cross section, a crank shape with one end relatively small in diameter and the other end relatively large in diameter. In the first embodiment, the second yoke member 32 includes a plurality of second claw portions 42 on one end side thereof and a second annular portion 44 on the other end side thereof. The second claw portions 42 are formed into a substantially inverted L-like cross-sectional shape so as to be radially inwardly decreased in diameter. These second claw portions 42 are arranged coaxially with the steering shaft (rotation axis Z) at predetermined circumferential intervals around the magnetic member 21 and circumferentially alternated with the first claw portions 41. The second annular portion 44 is continuously formed into an annular shape along the circumferential direction of the rotation axis Z and is connected to base ends of the second claw portions 42 so as to connect the second claw portions 42.

The first and second yoke members 31 and 32 are arranged such that the first and second claw portions 41 and 42 are alternately and coaxially aligned with each other and such that the second annular portion 44 is spaced apart from and faces an outer circumferential side of the first annular portion 43. In this arrangement, the adjacent claw portions 41 and 42 are connected to each other through an insulating part 34. The insulating part 33 is formed of the same or similar resin material to that of the magnetic member 22. The yoke members 31 and 32 are then fixed to the outer circumference of the input shaft member 1 through a sleeve 34. The sleeve 34 is formed of a predetermined metal material in a substantially cylindrical shape and fitted in an inner circumferential side of the first annular portion 43. As a specific means to fix the yoke members 31 and 32 to the outer circumference of the input shaft member 1 through the sleeve 34, a tapered front end portion 34a of the sleeve 34 is fitted around and circumferentially laser welded to a stepwisely diameter-increased large-diameter portion 1a of the input shaft member 1 as in the case of the magnetic member 20.

Furthermore, the first and second claw portions 41 and 42 have first and second axial extending regions 41a and 42a extending in an axial direction of the rotation axis Z and radially facing the permanent magnet 21 and first and second radial extending regions 41b and 42b bent from the axial extending portions 41a and 42a and extending in a radial direction of the rotation axis Z, respectively. An axial length of the respective axial extending portions 41a and 42a is set larger than at least an axial length of the permanent magnet 21 such that the permanent magnet 21 can be entirely surrounded by the axial extending portions 41a and 42a from the radially outside.

Each of the first and second magnetosensitive members 51 and 52 has an annular shape formed with circumferential ends and extends over a circumferential region of over 180° around the rotation axis Z. The first and second magnetosensitive members 51 and 52 are arranged on inner and outer circumferential sides so as to overlap each other when viewed in the radial direction and accommodate the pair of magnetic sensors 60 and 60 in the space between the after-mentioned first and second flat portions 51a and 52a.

In the first embodiment, the first magnetosensitive member 51 has a substantially annular shape extending over a wide circumferential region of approximately 320°, with a first cut 51b formed in the remaining circumferential region. The first flat portion 51a is formed, on a side of the first magnetosensitive member 51 opposite from the first cut 51b (i.e., at a position where the first flat portion 51a and the first cut 51a are symmetric with respect to a point), by being deformed radially outwardly into a substantially rectangular cross-sectional shape. On the other hand, the second magnetosensitive member 52 has a substantially annular shape extending in a narrower circumferential region of approximately 290° than that of the first magnetosensitive member 51 with a second cut 52b formed in the remaining circumferential region. The second flat portion 52a is formed, on a side of the second magnetosensitive member 52 opposite from the second cut 52b (i.e., at a position where the second flat portion 52a and the second cut 52a are symmetric with respect to a point), by being deformed radially inwardly into a substantially rectangular cross-sectional shape.

As the circumferential region of the first cut 51 in the inner-circumferential-side first magnetosensitive member 51 is narrower than the circumferential region of the second cut 52 in the outer-circumferential-side second magnetosensitive member 52 as mentioned above, the first and second magnetosensitive members 51 and 52 are made substantially equal in perimeter to each other. Thus, the magnetic path resistance between the first and second magnetosensitive members 51 and 52 can be uniformalized.

The first and second magnetosensitive members 51 and 52 are coupled to each other by an insulating part 53. The insulating part 53 is formed of the same or similar resin material to those of the magnetic member 20 and the yoke members 31 and 32. The first and second magnetosensitive members 51 and 52 are then fixed to the large-diameter portion 11a of the housing body 11 via the insulating part 53 by a predetermined fixing means (e.g. by fastening with a bolt or bolts) such that these magnetosensitive members 51 and 52 are located within the annular portions 43 and 44 and at least axially partially overlap the annular portions 43 and 44 when viewed in the radial direction.

Each of the magnetic sensors 60 and 60 includes a detecting portion 61 accommodated in the radial space between the first and second magnetosensitive members 51 and 52 and having a hall IC equipped with a hall element to detect a magnetic field (magnetic flux) passing through between the first and second magnetosensitive members 51 and 52 (flat portions 51a and 52a) and a connection terminal 62 connecting the detecting portion 61 to a control board 63, which is situated above the torque sensor TS1 (see FIG. 2). Namely, the magnetic sensors 60 and 60 are fixed in position by connection of the connection terminals 62 to the control board 63 and disposed in the radial space between the magnetosensitive members 51 and 52 with a predetermined air gap left between the magnetic sensor 60 and the magnetosensitive member 51, 52. In each of these magnetic sensors 60 and 60, the detecting portion 61 detects the density of the magnetic flux passing through between the magnetosensitive members 51 and 52 by the hall effect of the hall element and generates an output signal responsive to the density of the magnetic flux for torque calculation by the control board 63.

The control board 63 is herein connected to an ECU 4 (see FIG. 1) via a board-to-board connector 64, which is led into the housing body 11 through a window hole 11c of the large-diameter portion 11a of the housing body 11, as shown in FIG. 2.

The operation and effects of the torque sensor unit TS1 according to the first embodiment will be explained below with reference to FIGS. 1 to 6.

In the torque sensor unit TS1, the pole boundaries of the permanent magnet 21 are located exactly midway between the first and second claw portions 41 and 42 in the circumferential direction when the steering shaft is in a neutral state with the application of no steering torque to the input shaft member 1 (i.e., to between the shaft members 1 and 3). In this state, the magnetic path resistance of the permanent magnet 21 relative to the first claw portions 41 becomes equal to the magnetic path resistance of the permanent magnet 21 relative to the second claw portions 42. As a result, the magnetic field of the permanent magnet 21 gets short-circuited between the first and second claw portions 41 and 42 and does not leak to the annular portions 43 and 44. Accordingly, the magnetic flux of the magnetic field is not detected by the magnetic sensor 60, 60.

When the steering torque is applied to the input shaft member 1 (i.e., to between the shaft members 1 and 3) by steering operation of the steering wheel SW, the pole boundaries of the permanent magnet 21 are biased toward one of the first and second claw portions 41 and 42 in the circumferential direction. The magnetic path resistance of the permanent magnet 21 relative to one of the claw portions 41 and 42 to which the pole boundaries are biased becomes higher than the magnetic path resistance of the permanent magnet 21 relative to the other claw portions 41, 42. As a result, the magnetic field of the permanent magnet 21 leaks to the annular portions 43 and 44 and flows from the annular portions 43 and 44 to the adjacent magnetic poles so that the magnetic flux of the magnetic field passes through from one magnetosensitive member 51, 52 to the other magnetosensitive member 51, 52. The density of the magnetic flux is accordingly detected by the magnetic sensor 60, 60. The steering torque is calculated based on the output signal of the magnetic sensor 60, 60. Then, the steering assist torque of the electric motor M is determined based on the calculated steering toque. At this time, the direction of steering of the vehicle wheels and the direction of application of the steering assist torque are specified according to the direction of the magnetic flux passing between the magnetosensitive members 51 and 52.

As mentioned above, the torque sensor TS1 according to the first embodiment allows, even when the filling material 22 is deteriorated with time or broken by temperature changes, the support portions 26 and the engagement protrusions 27 of the metallic sleeve 23 and the claw portions 41 (radial extending regions 41b) of the first yoke member 31 to prevent the permanent magnet 21 from being displaced in not only the axial and radial directions but also the circumferential direction (rotational direction).

In more detail, the permanent magnet 21 is placed on the support portions 26 so that the support portions 26 can serve as a stopper against vertically downward movement of the permanent magnet 21. It is thus possible to prevent vertically downward displacement of the permanent magnet 21 even in the event of e.g. deterioration of the filling material 22.

As the support portions 26 extend radially outward with respect to the sleeve body 25, the diameter of the permanent magnet 21 placed on the support portions 26 can be set large for improvement in the sensitivity of the toque sensor unit TS1.

Further, the engagement protrusions 27 are engaged in the respective engagement grooves 24 so that the engagement protrusions 27 and the engagement grooves 24 can be prevented from relative radial movement and from relative circumferential movement (relative rotation). It is thus possible to prevent radial and circumferential displacement of the permanent magnet 21 in the event of e.g. deterioration of the filling material 22.

As the engagement protrusions 27 are formed on the sleeve 23; and the engagement grooves 24 are formed in the permanent magnet 21, the engagement protrusions 27 can be effectively protected from breakage for improvement in the durability of the torque sensor TS1 as compared to the case where the engagement protrusions are formed on the permanent magnet 21.

Furthermore, the first yoke member 31 is located vertically above and relatively close to the permanent magnet 21 so that the radial extending regions 41b of the first yoke member 31 can serve as a stopper against vertically upward movement of the permanent magnet 21. It is thus possible to prevent vertically upward displacement of the permanent magnet 21 in the event of e.g. deterioration of the filling material 22.

As the permanent magnet 21 and the sleeve 23 are coupled via the filling material 22, the difference in Young's modulus between the permanent magnet 21 and the sleeve 23 is absorbed by the filling material 22. In particular, the filling material 22 is prepared from the resin material having a smaller Young's modulus than that of the permanent magnet 21 so as to extend over and cover the permanent magnet 21 and the sleeve 23. Consequently, the coupling force of the permanent magnet 21 and the sleeve 23 can be increased with expansion or shrinkage of the filling material 22 by temperature changes.

To be more specific, the filling material 21 is filled in the gaps such as radial gap C2 and circumferential gaps C1 and C3 between the permanent magnet 21 and the sleeve 23 as mentioned above in the first embodiment. In these respective gaps C1, C2 and C3, the filling material 21 has a greater degree of thermal expansion than that of the permanent magnet 21 under high-temperature conditions. By such expansion, the filling material 21 is forced against and brought into more intimate contact with the permanent magnet 21 and the sleeve 23 so as to increase the coupling force of the permanent magnet 21 and the sleeve 23.

Under low-temperature conditions, by contrast, the filling material 21 has a smaller degree of shrinkage than that of the permanent magnet 21 under low temperatures. By such shrinkage, the filling material 21 is brought into more intimate contact with the permanent magnet 21 and the sleeve 23 so as to hold therebetween the permanent magnet 21 and the sleeve 23 from the outside and thereby increase the coupling force of the permanent magnet 21 and the sleeve 23. In particular, the permanent magnet 21 and the sleeve 23 are held between the upper covering portion 22b and the lower covering portion 22c by cold shrinkage of these covering portions 22b and 22c. The axial position of the permanent magnet 21 can be thus maintained more stably.

The magnetic field characteristics of the permanent magnet 21 can be prevented from being changed by the engagement grooves 24 as the engagement grooves 24 are arranged on the inner circumferential side of the permanent magnet 21; and the claw portions 41 and 42 of the first and second yoke members 31 and 32 are arranged on the outer circumferential side of the permanent magnet 21.

In the first embodiment, the sleeve 23 is of the non-magnetic material. The sleeve 23 can be thus prevented from being magnetized with the magnetic field of the permanent magnet 21. There is no fear that the magnetic field characteristics will be changed by the adoption of the sleeve 23.

In addition, the first output shaft member 3 to which the magnetic member 20 (permanent magnet 21) is fixed is of the magnetic material in the first embodiment. By the arrangement of such a magnetic member on the inner circumferential side of the permanent magnet 21, the permeance coefficient of the permanent magnet 21 can be improved. On the other hand, the first and second claw portions 41 and 42, which are used for torque detection, are arranged on the outer circumferential side of the permanent magnet 21 and separated far away from the magnetic first output shaft member 3. By this arrangement, the influence of the magnetic first output shaft member 3 on the torque detection accuracy can be minimized.

Figure 13:
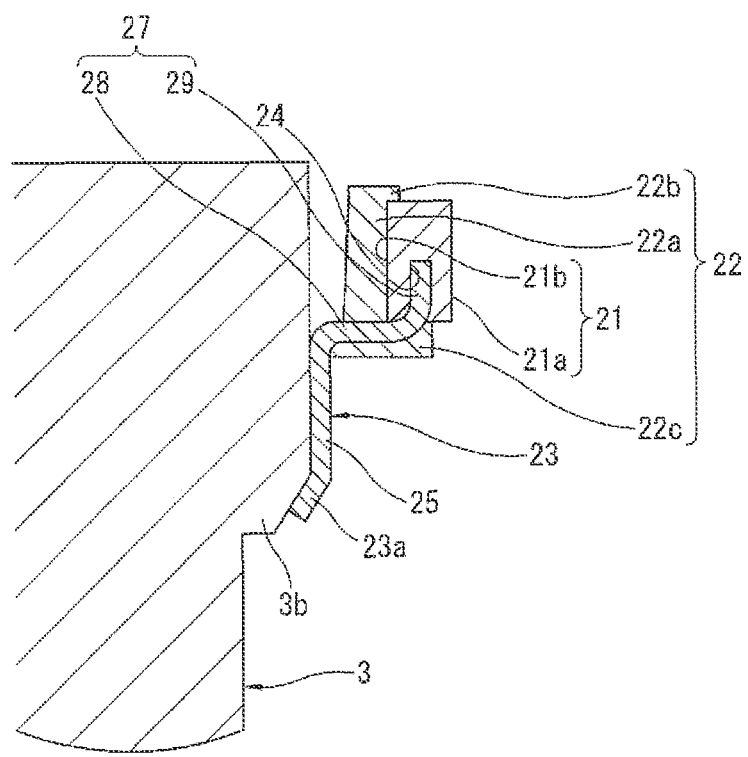
FIG. 13 is an enlarged view corresponding to FIG. 11 and showing a first modification of the torque sensor unit according to the first embodiment of the present invention.

FIG. 13 shows a first modification example of the torque sensor according to the first embodiment of the present invention, in which the amount of radial offset of the respective engagement protrusions 27 is enlarged.

In the present first modification example, the engagement grooves 24 are cut in a radially middle portion of the lower end face of the permanent magnet 21 such that each of the engagement grooves 24 extends in a rectangular hole shape from the lower side; and both of the inner and outer circumferential surfaces 21a and 21b of the permanent magnet 21 are made even.

Accordingly, the engagement grooves 24 and the engagement protrusions 27 engaged therein are arranged to face the outer circumferential surface 21a of the permanent magnet 21 but not face the claw portions 41 and 42 of the first and second yoke members 31 and 32. It is thus possible in the present first modification example to obtain the same effects as in the first embodiment even though the present first modification example is lower in workability than the first embodiment.

In particular, the engagement grooves 24 are bag-shaped in the present first modification example. The thermal expansion effects of the filling material in the radial and circumferential gaps C2 and C3 can be thus increased for further improvement in the coupling force of the permanent magnet 21 and the sleeve 23 under high-temperature conditions.

Figure 14:
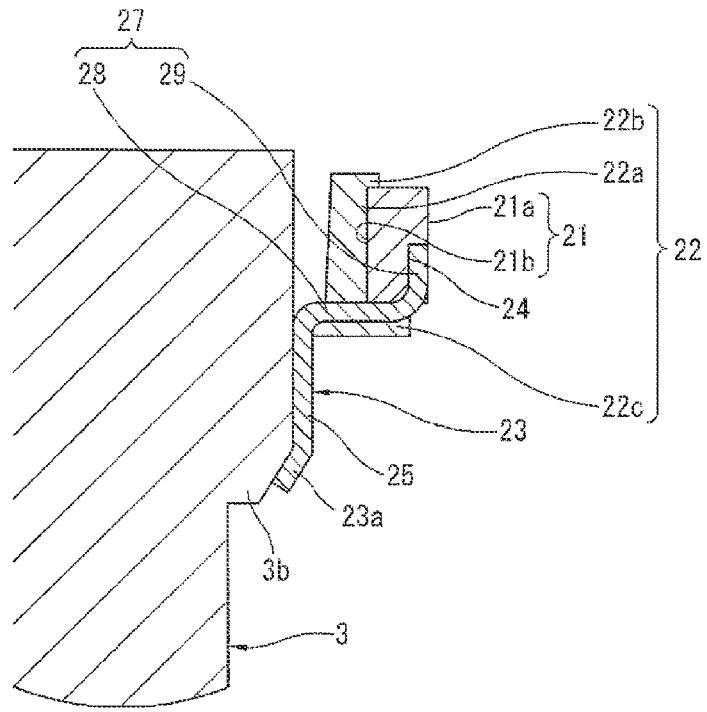
FIG. 14 is an enlarged view corresponding to FIG. 11 and showing a second modification of the torque sensor unit according to the first embodiment of the present invention.

FIG. 14 shows a second modification example of the torque sensor according to the first embodiment of the present invention, in which the amount of radial offset of the respective engagement protrusions 27 is more enlarged than in the first modification example.

In the present second modification example, the engagement grooves 24 are cut in the outer circumferential surface 21a of the permanent magnet 21; and the elastic base portions 28 of the engagement protrusions 27 are elongated such that the engagement portions 29 of the engagement protrusions 27 are inserted and engaged into the respective engagement grooves 24 from the inner circumferential side of the permanent magnet 21.

Even though the engagement grooves 24 and the engagement protrusions 27 engaged therein are arranged to face the outer circumferential surface 21a of the permanent magnet 21 and to face the claw portions 41 and 42 of the first and second yoke members 31 and 32 in the present second modification example, it is possible in the present second modification example to obtain the same effects as in the first embodiment without the magnetic field of the permanent magnet 21 being influenced by the opposed arrangement of the engagement grooves and protrusions 24 and 27.

Figure 15:
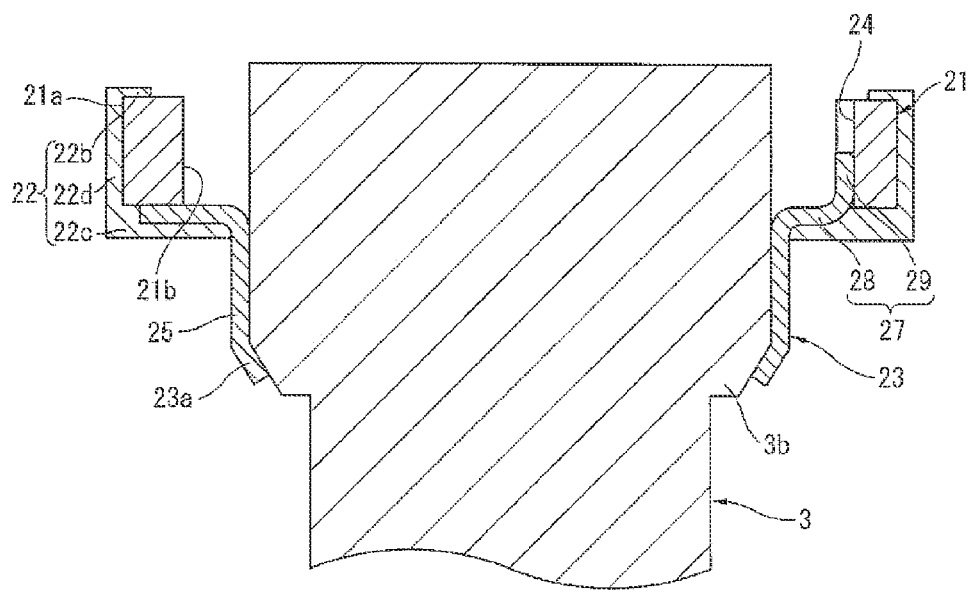
FIG. 15 is an enlarged view corresponding to FIG. 11 and showing a third modification of the torque sensor unit according to the first embodiment of the present invention.

FIG. 15 shows a third modification example of the torque sensor according to the first embodiment of the present invention, in which the configuration of the filling material 22 is modified.

In the present third modification example, the filling material 22 is formed with the upper and lower covering portions 22b and 22c and an outer circumferential covering portion 22d so as to cover the outer circumferential side of the permanent magnet 21 whereas the filling material 22 is formed to cover the inner circumferential side of the permanent magnet 21 in the first embodiment.

It is possible to obtain the same effect as in the first embodiment even when the filling material 22 is arranged on the outer circumferential side of the permanent magnet 21 in the present third modification example.

Figure 16:
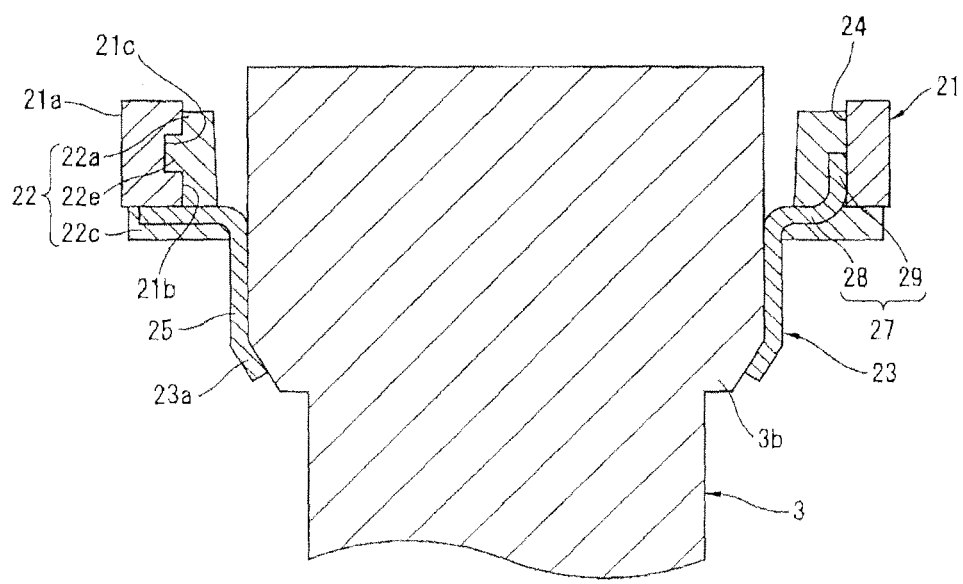
FIG. 16 is an enlarged view corresponding to FIG. 11 and showing a fourth modification of the torque sensor unit according to the first embodiment of the present invention.

FIG. 16 shows a fourth modification example of the torque sensor according to the first embodiment of the present invention, in which the configuration of the filling material 22 is modified.

Although the upper covering portion 22b is provided on the filling material 22 in the first embodiment, the upper covering portion 22b is removed from the filling material 22 in the present fourth modification example. Instead, a continuous circumferential groove 21c is cut in the inner circumferential surface 21b of the permanent magnet 21 along the circumferential direction such that the filling material 22 is filled in between the permanent magnet 21 and the sleeve 23, including the circumferential groove 21, to form the inner circumferential covering portion 22a.

Figure 17:
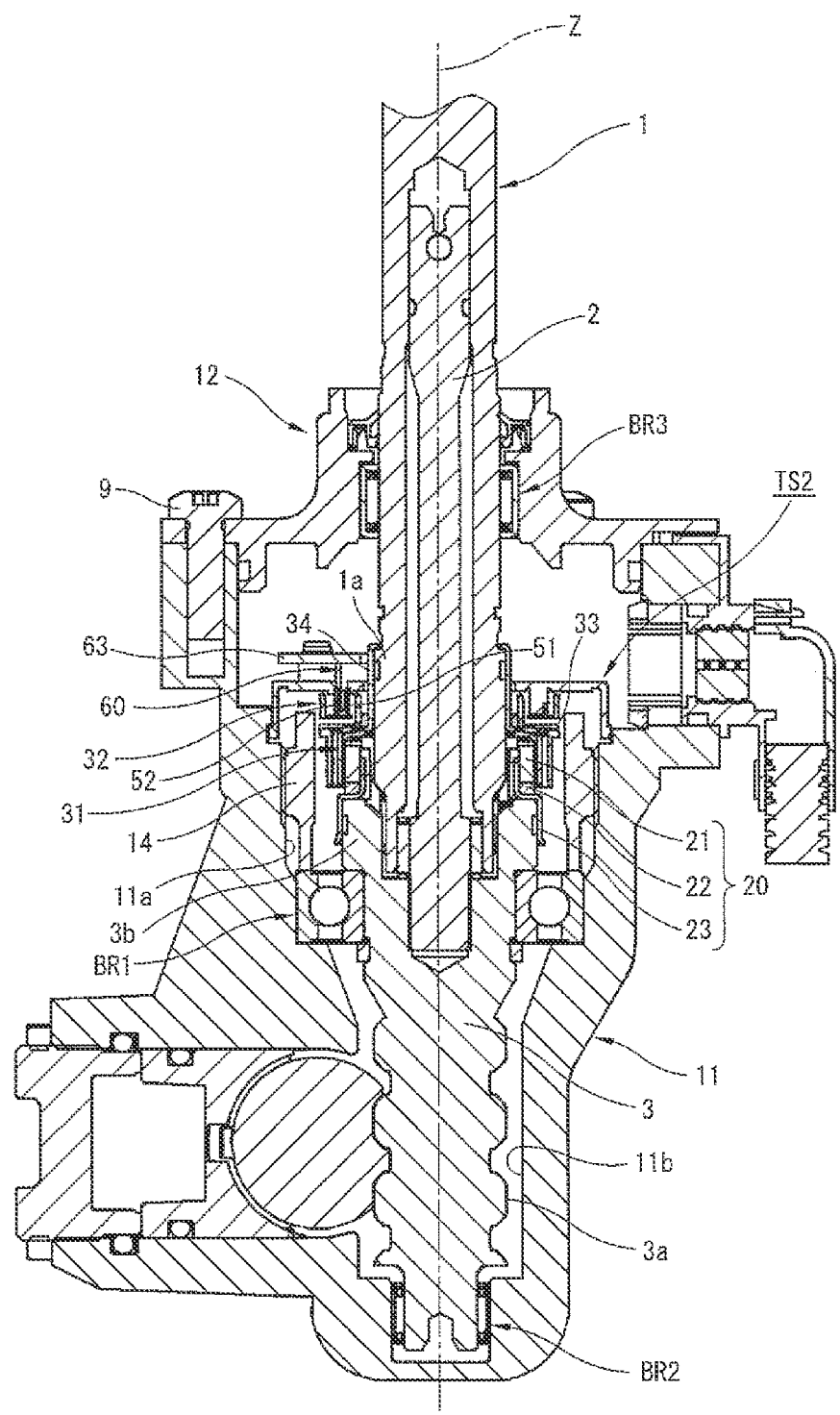
FIG. 17 is a vertical section view of a torque sensor unit according to a second embodiment of the present invention as applied to a steering system (a first rack and pinion mechanism and its surroundings) of the power steering device of FIG. 1.
Figure 18:
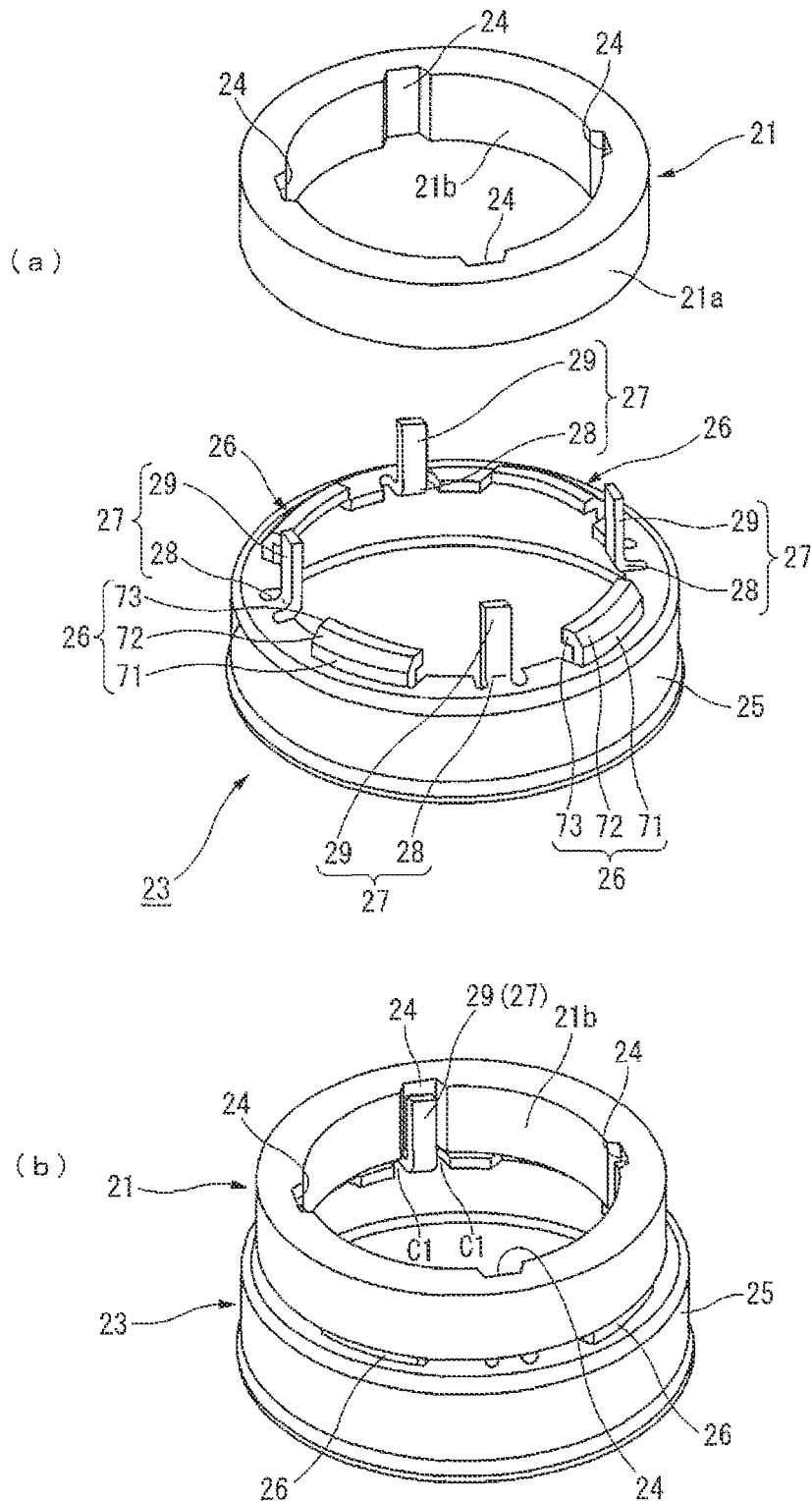
FIG. 18(*a*) is an exploded perspective view of a magnetic member shown FIG. 17.
Figure 19:
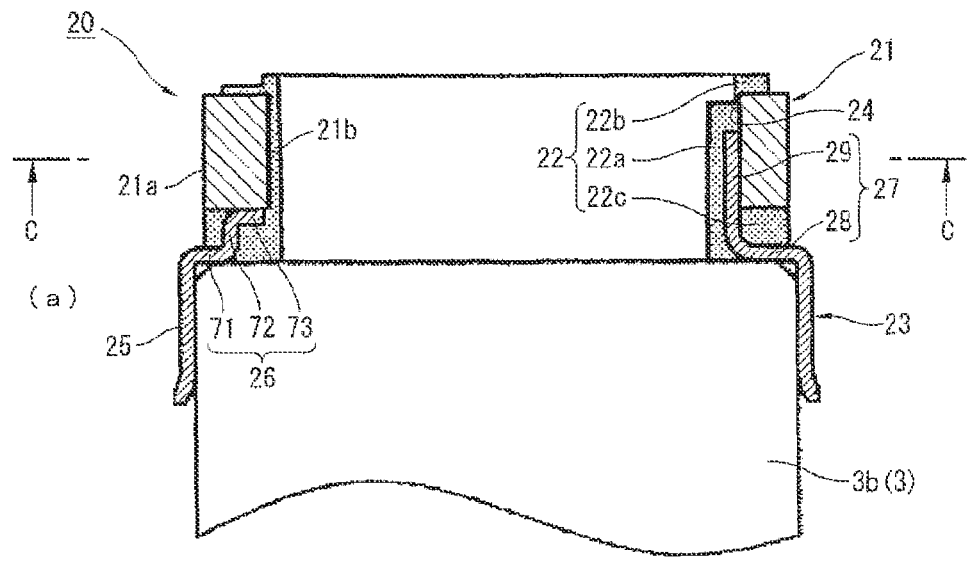
FIG. 19(*a*) is a section view of the vicinity of the magnetic member shown in FIG. 17.
Figure 19:
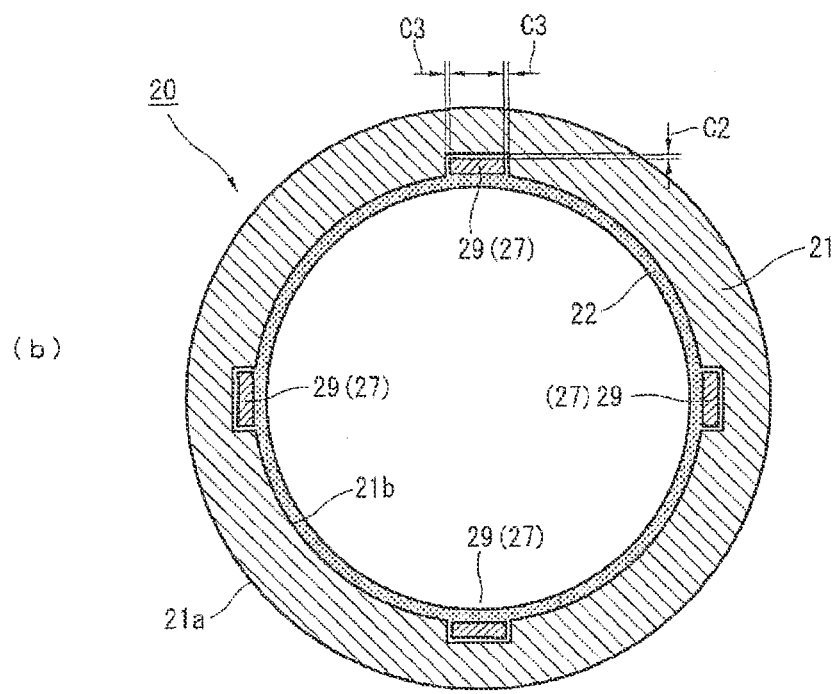

It is possible even in the present fourth modification example to obtain the same effects as in the first embodiment in terms of stable holding of the permanent magnet 21. As the coupling force of the permanent magnet 21 and the sleeve 23 can be increased by thermal expansion of the filling material 21 in the circumferential groove 21 under high-temperature conditions and can be increased by cold shrinkage of the lower covering portion 22c and groove filling portion 22e of the filling material 22 filled in the circumferential groove 22c under low-temperature conditions, it is also possible to obtain the same effects in terms of expansion or shrinkage of the filling material 22 by temperature changes Second Embodiment FIGS. 17 to 19 show the torque sensor unit according to the second embodiment of the present invention. In the second embodiment, the basic structures of the torque sensor unit and the electric power steering device are similar to those in the first embodiment. Thus, the same reference numerals are assigned to parts and portions identical to those in the first embodiment; and detailed explanations of those parts and portions are omitted herefrom.

The power steering device to which the torque sensor unit according to the second embodiment is applied has a lock nut 14 screwed to the inner circumference of the large-diameter portion 11a of the housing body 11 and a ball bearing fixed as the bearing BR1 by the lock nut 14 differently from that according to the first embodiment. The torque sensor unit TS2 is accommodated in an inner circumferential side of the lock nut 14.

The torque sensor unit TS2 is different from the torque sensor unit TS1 in that: both of the support portions 26 and the engagement protrusions 27 of the sleeve 23 extend radially inwardly from the base end of the sleeve body 25; and the permanent magnet 21 has a diameter smaller than that of the sleeve body 25.

More specifically, the support portions 26 are stepwisely radially inwardly decreased in diameter. Each of the support portions 26 includes a first support region 71 extending radially inwardly from the base end of the sleeve body 25 and brought into contact with an end face of the large-diameter portion 3b, a base region 72 extending vertically upward from the first support region 71 and a second support region 73 extending radially inwardly from a distal end of the base region 72 and flanged in shape to directly support thereon the permanent magnet 21. Flat support surfaces 73a are formed on upper sides of the respective support portions 6 such that the permanent magnet 21 is placed on the support surfaces 73a.

As the support portions 26 of the sleeve 23 extend radially inwardly from the base end of the sleeve body 25, the radial dimension of the torque sensor unit TS2 can be reduced. It is thus possible in the second embodiment to obtain improvement in the mountability of the torque sensor unit TS2 to the application target such as power steering device and attain downsizing of the application target.

Further, the support portions 26 are shaped to raise the regions for support of the permanent magnet 21 (i.e., second support regions 73) from the sleeve body 25 by the base regions 72 such that the lower covering portion 22c of the resin material 22 can extend in raised spaces between the permanent magnet 21 and the sleeve 23 and below the second support regions 73 so as to axially engage parts of the resin material 22 with the second support regions 75. It is thus possible to more tightly couple the permanent magnet 21 and the sleeve 23 for improved holding of the permanent magnet 21.

Figure 20:
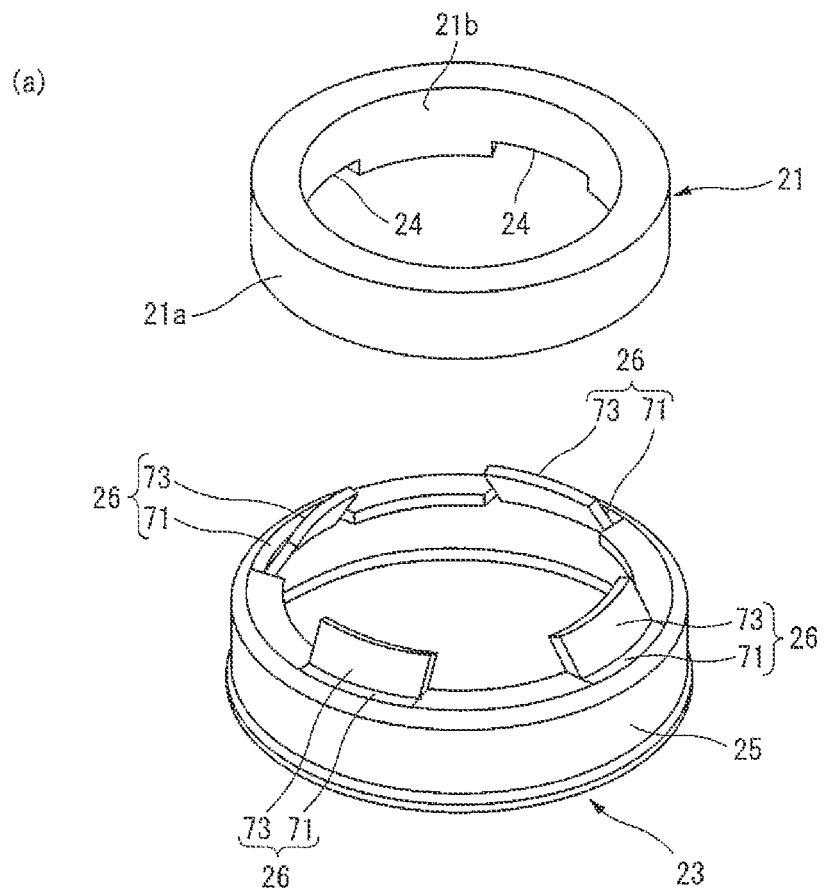
FIG. 20(*a*) is an exploded perspective view of a magnetic member in a first modification example of the torque sensor unit according to the second embodiment of the present invention.
Figure 20:
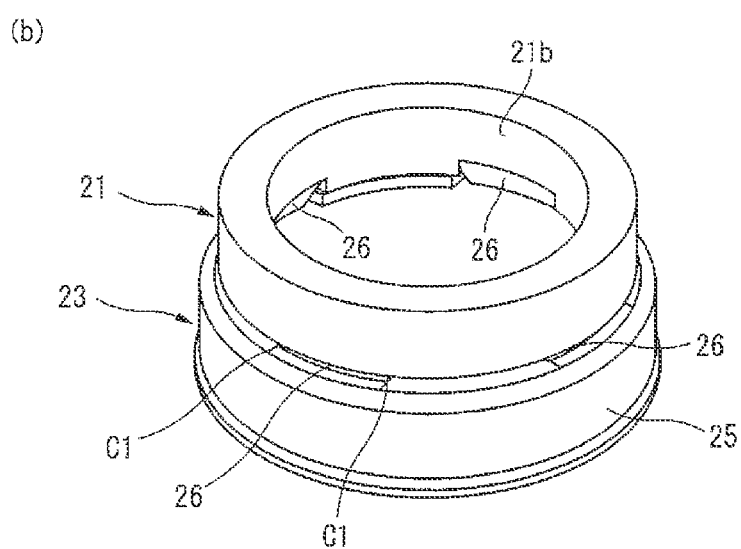
Figure 21:
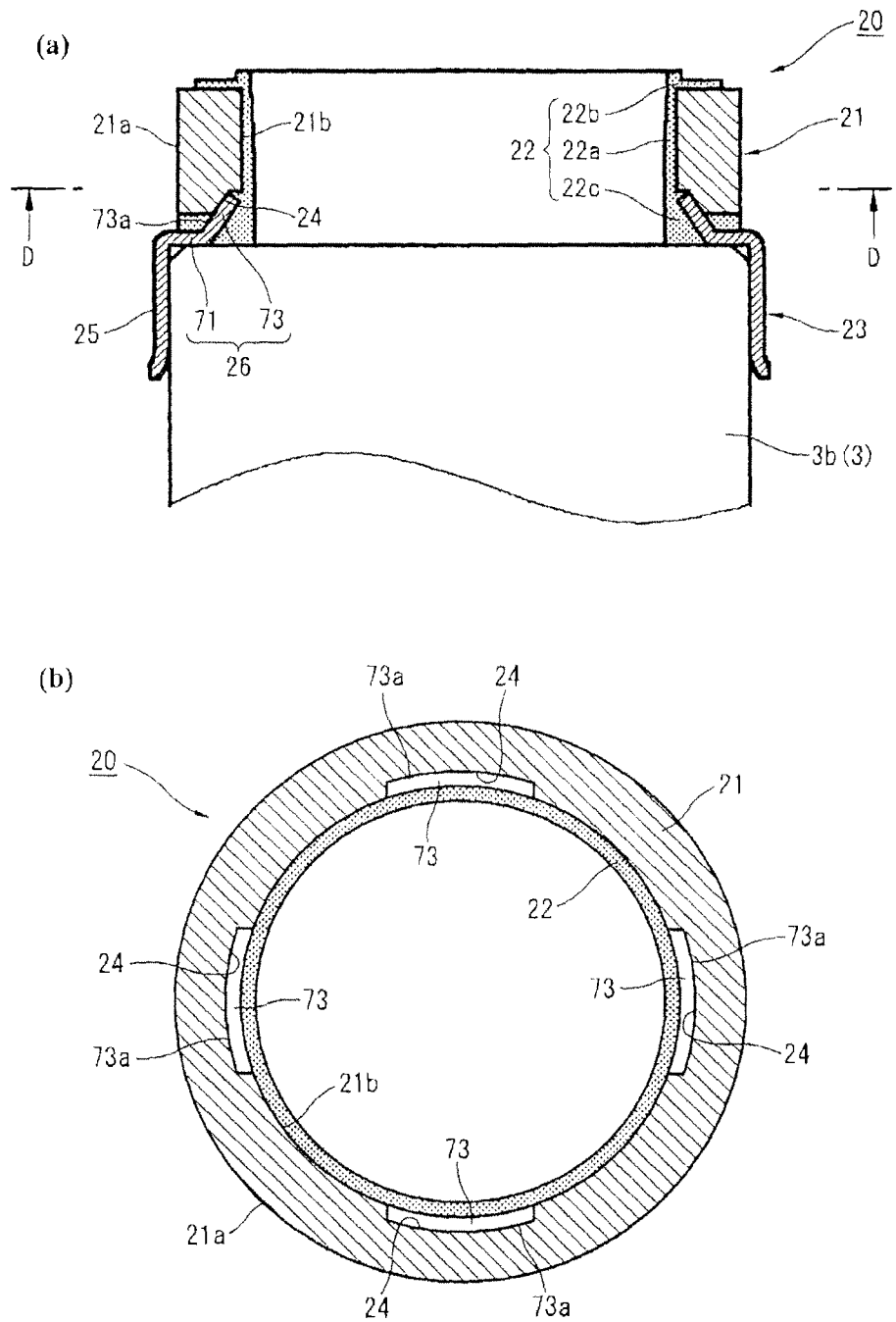
FIG. 21(*a*) is a section view of the vicinity of the magnetic member in the first modification example of the torque sensor unit of FIG. 17.

FIGS. 20 and 21 show a first modification example of the torque sensor according to the second embodiment of the present invention, in which the engagement protrusions 27 are removed; and the support portions 26 are modified to perform the function of the engagement protrusions 27, respectively.

In the present first modification example, each of the support portions 26 is configured as follows: the base region 72 is formed integral with the second support region 73; and the second support region 73 is formed into a substantially conical tapered shape so as to be gradually increased in diameter toward the base end side. In accordance with such a configuration of the second support regions 73, the engagement grooves 24 are cut in an inner circumferential edge of the lower end of the permanent magnet 21 with a depth smaller than a height of the second support regions 73 so as to engage the second support regions 73 in the respective engagement grooves 24.

As mentioned above, the second support regions 73 are conical tapered in shape. The permanent magnet 21 can be thus prevented from axial (vertically downward) movement and radial movement relative to the sleeve 23 by outer lateral support surfaces 73a of the second support regions 73. The permanent magnet 21 can also be prevented from circumferential movement relative to the sleeve 23 by circumferential end surfaces of the second support regions 73. It is thus possible to simplify the configuration of the sleeve 23 and obtain, in addition to the same effects as in the second embodiment, productivity improvement and cost reduction of the torque sensor unit TS2.

As the second support regions 73 are conical tapered in shape, it is possible to allow centering (axis alignment) of the permanent magnet 21 by the conical tapered support surfaces 73a in the event of e.g. deterioration of the filling material 22 and thereby possible to secure the coaxiability of the permanent magnet 21.

Figure 22:
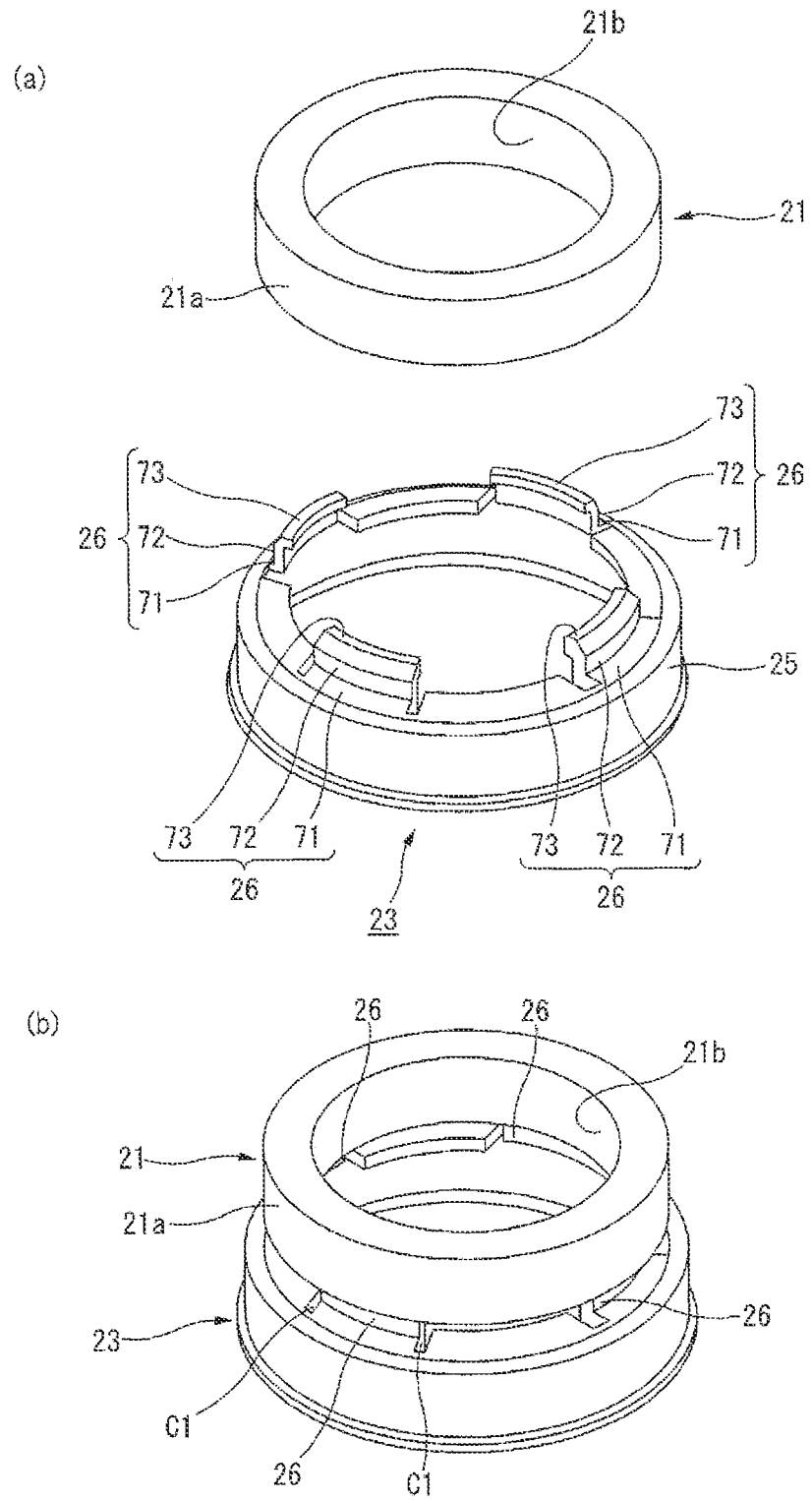
FIG. 22(*a*) is an exploded perspective view of a magnetic member in a second modification example of the torque sensor unit according to the second embodiment of the present invention.
Figure 23:
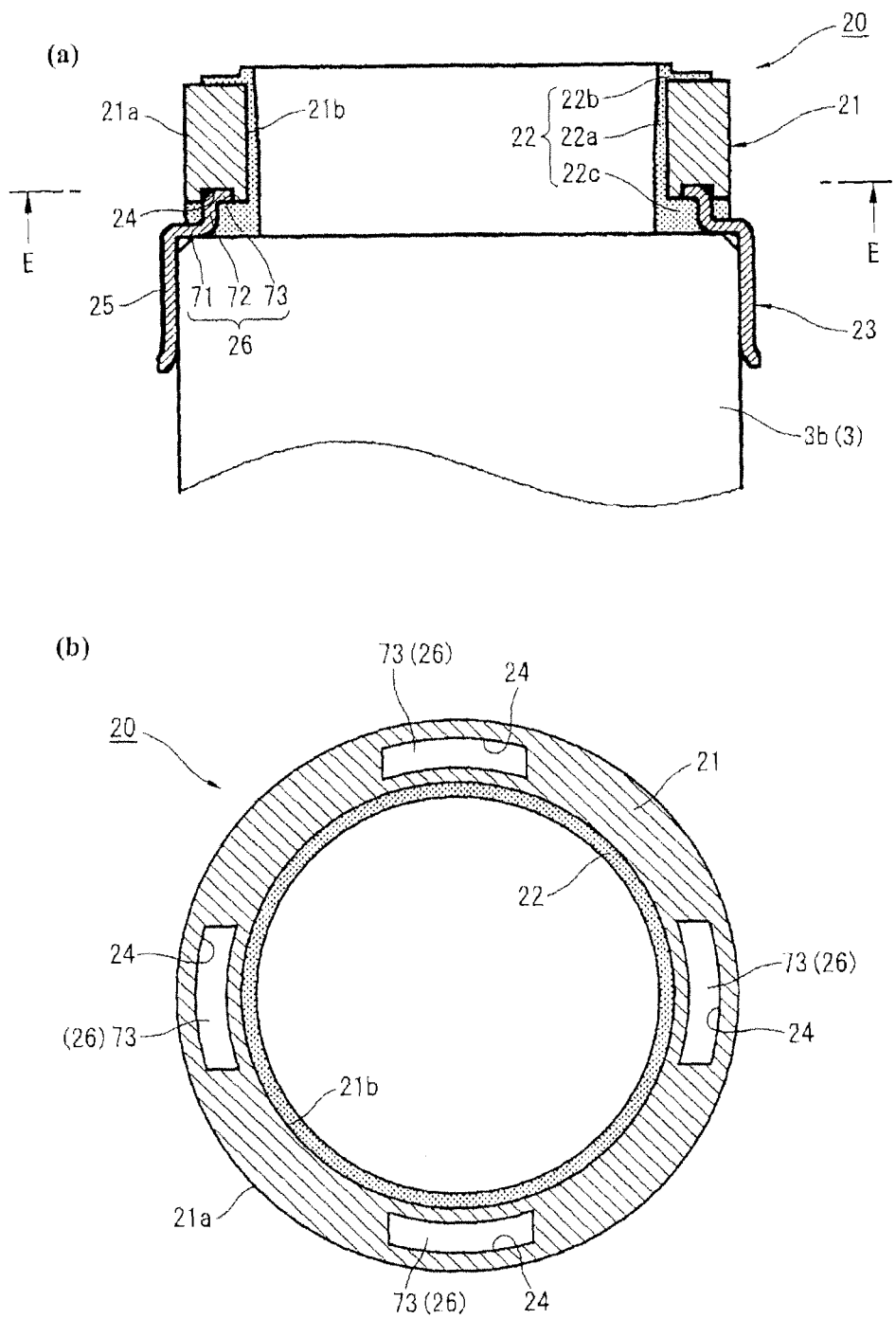
FIG. 23(*a*) is a section view of the vicinity of the magnetic member in the second modification example of the torque sensor unit of FIG. 17.

FIGS. 22 and 23 show a second modification example of the torque sensor according to the second embodiment of the present invention, in which the engagement protrusions 27 are removed; and the support portions 26 are modified to perform the function of the engagement protrusions 27, respectively.

In the present second modification example, each of the support portions 26 is configured to integrate therein the engagement protrusion 27. Further, the engagement grooves 24 are cut as concave grooves in a radially middle portion of the lower end face of the permanent magnet 21 so as to extend in an arc shape along the circumferential direction and engage therein the support portions 26.

As the second support regions 73 are engaged in the concave engagement grooves 24 of the lower end face of the permanent magnet 21 as mentioned above, the permanent magnet 21 can be prevented from vertically downward movement relative to the sleeve 23 by the support surfaces 73a of the second support regions 73, which are situated below the permanent magnet 21, and can be prevented from radial and circumferential movement relative to the sleeve 23 by engagement of the second support regions 73 into the concave engagement grooves 24. It is thus possible in the present second modification example to obtain productivity improvement and cost reduction of the torque sensor unit TS2 as in the case of the above first modification example.

The present invention is not limited to the above embodiments. As long as the above-mentioned effects of the present invention are obtained, various changes and modifications can be made to the configurations of the yoke members 31 and 32, the magnetosensitive members 51 and 52 etc. that are not directly relevant to the characteristic features of the present invention and made to the configurations of the permanent magnet 21 and the sleeve 23 that are relevant to the characteristic features of the present invention. The configurations of these structural components can be changed freely depending on the specifications of the torque sensor unit applied.

DESCRIPTION OF REFERENCE NUMERALS

1: Input shaft member (First shaft member)
2: Torsion bar
3: First output shaft member (Second shaft member)
20: Magnetic member
21: Permanent magnet (Magnet)
22: Filling material
23: Sleeve
23a: Tapered front end portion (Fixing part)
25: Sleeve body
26: Support portion (Axial position restricting part)
26a: Support surface
27: Engagement protrusion (Radial position restricting part)
31: First yoke member
32: Second yoke member
41: First claw portion
42: Second claw portion
43: First annular portion
44: Second annular portion
60: Magnetic sensor
TS1, TS2: Torque sensor unit
Z: Rotation axis (Rotation axis of rotating element)

The invention claimed is:

1. A torque sensor unit for detecting a torque applied to a rotating element, the rotating element having first and second shaft members formed of a metal material and connected to each other through a torsion bar, the torque sensor unit comprising:
a sleeve formed of a metal material and including: an annular or arc-shaped sleeve body surrounding the first shaft member; a fixing part provided on the sleeve body and fixing the sleeve body to the first shaft member; an axial position restricting part provided on the sleeve body and having a flanged portion extending radially inwardly from the sleeve body, the flanged portion having a support surface directed vertically upward during use of the torque sensor unit; and a radial position restricting part provided on the sleeve body and extending in a direction of a rotation axis of the rotating element;
an annular magnet formed of a composite material of resin and magnetic materials, with different magnetic poles alternately arranged in a circumferential direction, and surrounding the first shaft member, the magnet being placed on the support surface and thereby restricted in position in the direction of the rotation axis of the rotating element while being restricted in position in a radial direction by the radial position restricting part;
a filling material formed from a resin material having a smaller Young's modulus than that of the magnet and held in contact with the magnet and the radial position restricting part;
a first yoke member formed of a magnetic material, fixed to the second shaft member so as to rotate together with the second shaft member and including: a plurality of first claw portions facing the magnet; and a first annular portion connecting the first claw portions;
a second yoke member formed of a magnetic material, fixed to the second shaft member so as to rotate together with the second shaft member and including: a plurality of second claw portions circumferentially alternated with the first claw portions and facing the magnet; and a second annular portion connecting the second claw portions; and
a magnetic sensor having a hall element to detect a change in magnetic field between the first and second yoke members and generate an output signal such that the torque applied to the rotating element is detected based on the output signal from the magnetic sensor.

2. The torque sensor unit according to claim 1 wherein the axial position restricting part has a base portion extending vertically upward from the sleeve body; wherein the support surface extend radially inwardly from the base portion; and wherein the filling material is filled in between the magnet and the sleeve body.

3. The torque sensor unit according to claim 1, wherein the magnet has a concave engagement part formed at a surface thereof; wherein the radial position restricting part is engaged with the engagement part; and wherein the filling material is filled in the engagement part so as to surround the radial position restricting part.

4. The torque sensor unit according to claim 3, wherein the engagement part is arranged on an inner circumferential side of the magnet; wherein there is a predetermined radial gap defined between the radial position restricting part and the engagement part; and wherein the radial gap is set so as not to cause internal stress due to press contact with the radial position restricting part during cold shrinkage of the magnet.

5. The torque sensor unit according to claim 4, wherein the radial position restricting part has elasticity.

6. The torque sensor unit according to claim 1, wherein the filling material is filled in between the magnet and the sleeve and has a smaller Young's modulus than that of the magnet.

7. The torque sensor unit according to claim 1, wherein the radial position restricting part is arranged radially inside the magnet; and wherein the filling material is radially inside the magnet and the radial position restricting part.

8. The torque sensor unit according to claim 1, wherein the filling material has a substantially U-like shaped cross section so as to hold therebetween the magnet and the sleeve.

9. The torque sensor unit according to claim 1, wherein the material of the sleeve is a non-magnetic material.

10. The torque sensor unit according to claim 1, wherein the flanged portion is spaced apart from the radial position restricting part so as to define predetermined gaps on both sides of the radial position restricting part in the circumferential direction; and wherein the filling material is arranged so as to extend over the radial position restricting part in the circumferential direction and filled in the predetermined gaps between the radial position restricting part and the flanged portion.

11. The torque sensor unit according to claim 1, wherein a plurality of the radial position restriction parts are provided at circumferentially equally spaced positions.

12. The torque sensor unit according to claim 1, wherein the first and second yoke members are arranged so as to prevent vertically upward movement of the magnet.

13. The torque sensor unit according to claim 1, wherein the material of the first shaft member is a magnetic material; and wherein the first and second claw portions are arranged on an outer circumferential side of the magnet.

14. A torque sensor unit for detecting a torque applied to a rotating element, the rotating element having first and second shaft members formed of a metal material and connected to each other through a torsion bar, the torque sensor unit comprising:
    an annular magnet formed of a composite material of resin and magnetic materials, with different magnetic poles alternately arranged in a circumferential direction, and surrounding the first shaft member;
    a sleeve formed of a metal material and including: an annular or arc-shaped sleeve body surrounding the first shaft member; a fixing part provided on the sleeve body and fixing the sleeve body to the first shaft member; and a position restricting part having a flanged portion extending radially inwardly from the sleeve body and adapted to restrict a position of the magnet in axial and radial directions;
    a first yoke member formed of a magnetic material, fixed to the second shaft member so as to rotate together with the second shaft member and including: a plurality of first claw portions facing the magnet; and a first annular portion connecting the first claw portions;
    a second yoke member formed of a magnetic material, fixed to the second shaft member so as to rotate together with the second shaft member and including: a plurality of second claw portions circumferentially alternated with the first claw portions and facing the magnet; and a second annular portion connecting the second claw portions;
    a filling material formed from a resin material having a smaller Young's modulus than that of the magnet and held in contact with the magnet and the sleeve; and
    a magnetic sensor having a hall element to detect a change in magnetic field between the first and second yoke members and generate an output signal such that the torque applied to the rotating element is detected based on the output signal from the magnetic sensor.

15. The torque sensor unit according to claim 14, wherein the position restricting part is provided on the sleeve body and has a contact surface held in contact with the magnet; and wherein the contact surface includes a tapered surface region increased in diameter toward one side in the axial direction.

16. The torque sensor unit according to claim 14, wherein the magnet has a concave engagement part opened at a vertically lower side thereof; and wherein the position restricting part is engaged with the engagement part.

* * * * *